Jan. 25, 1938.   R. W. CANFIELD ET AL   2,106,546
APPARATUS FOR FORMING GLASSWARE
Filed Feb. 14, 1935   9 Sheets-Sheet 1

Witness:
W. B. Thayer

Inventors:
Robert W. Canfield
and Thomas Waugh
by Brown Parham
Attorneys.

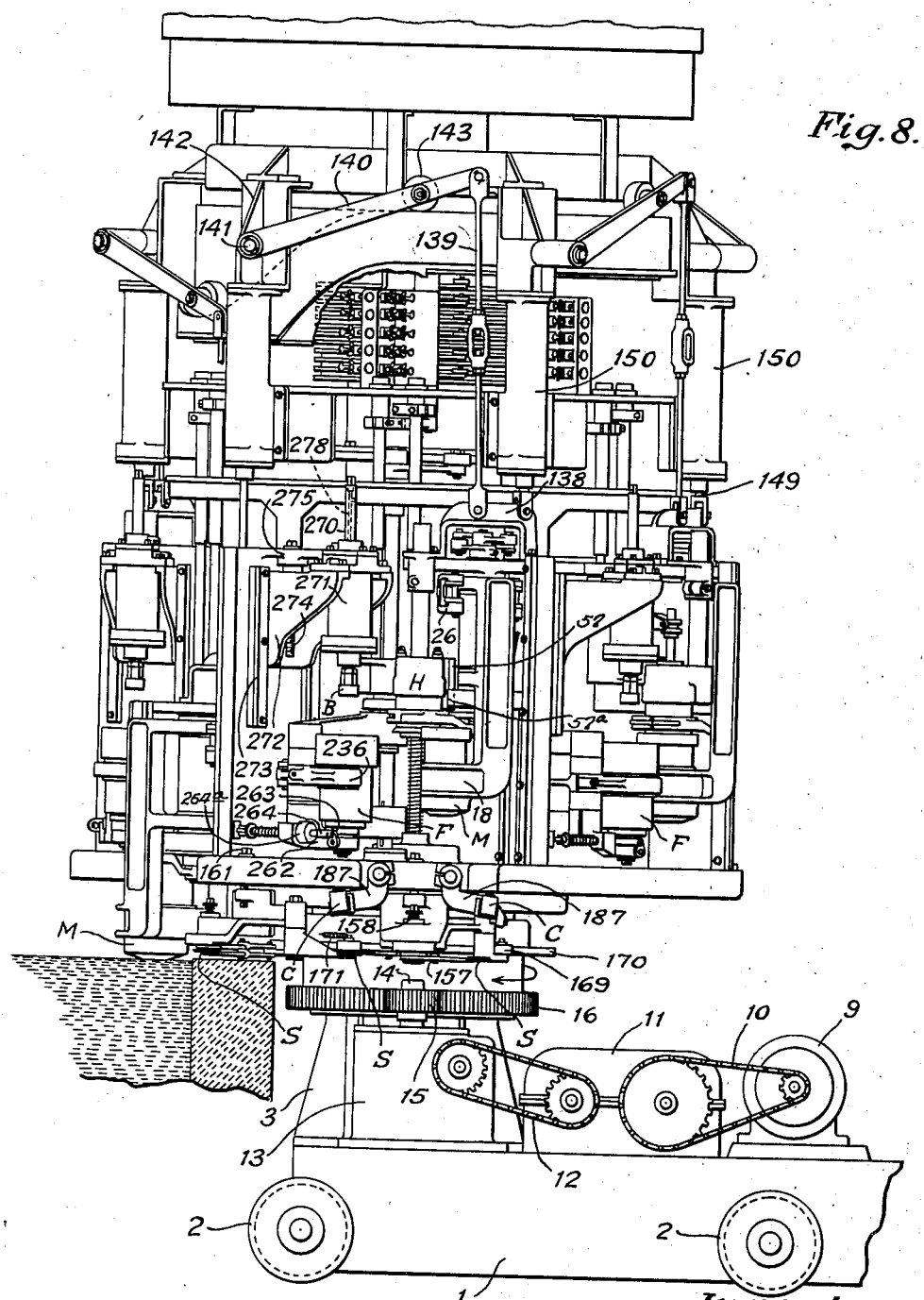

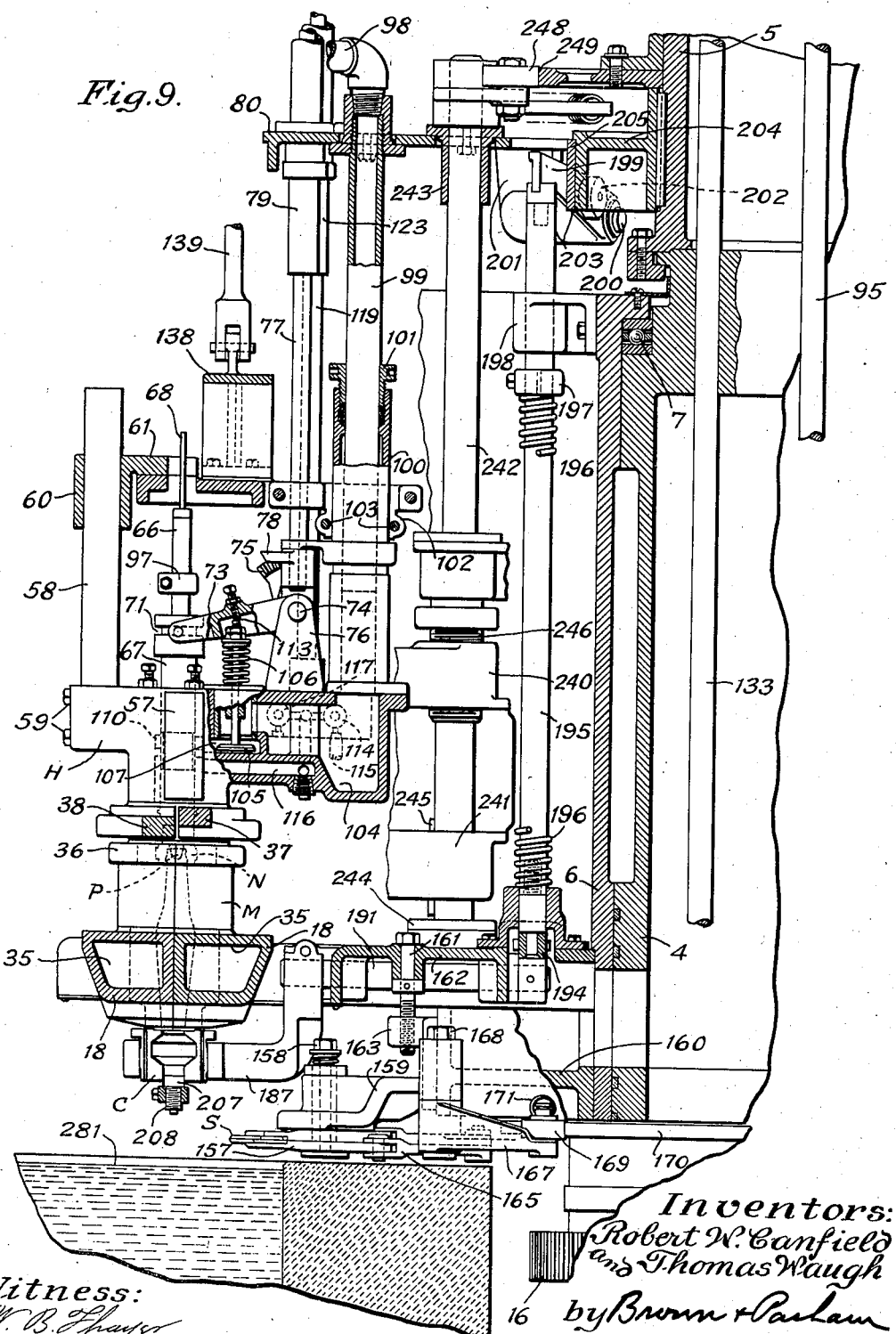

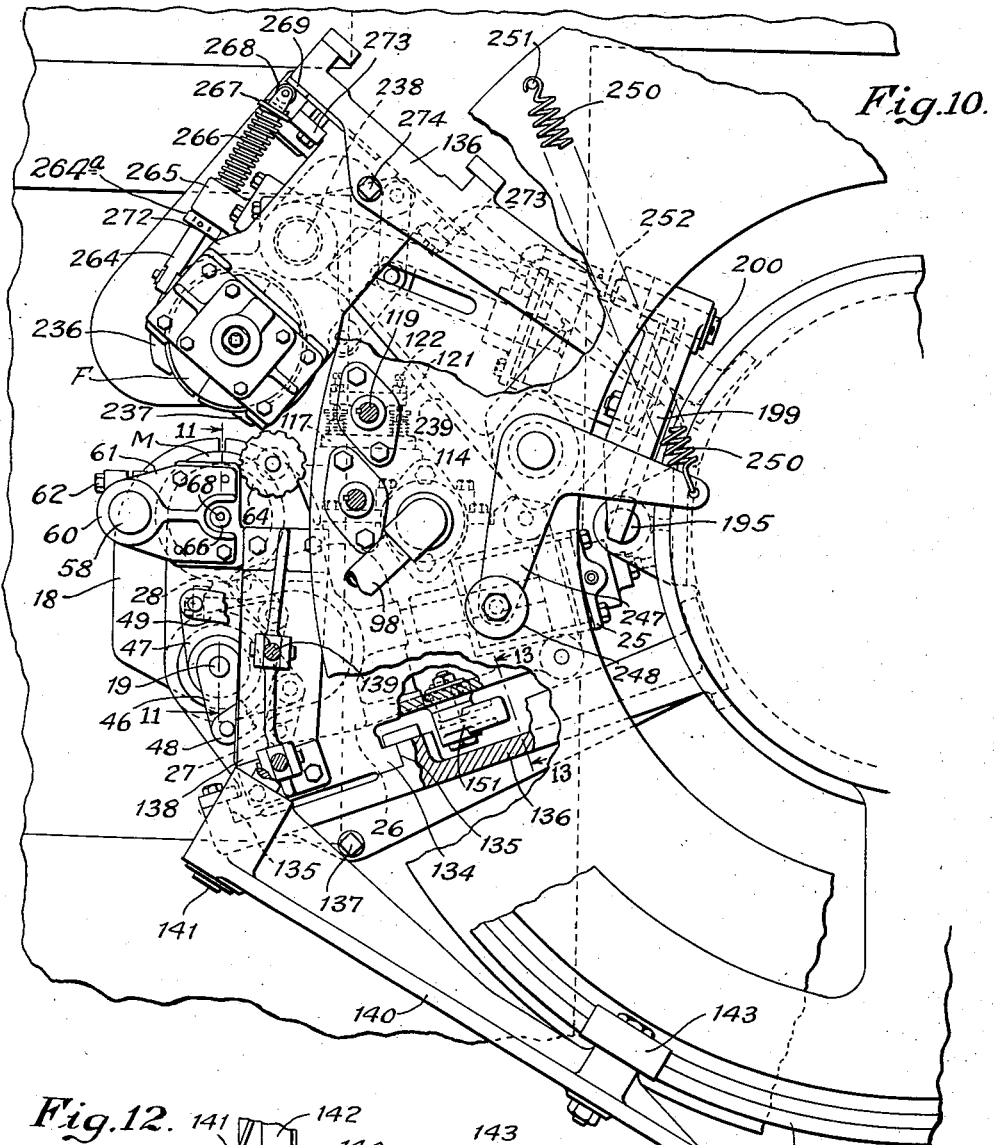
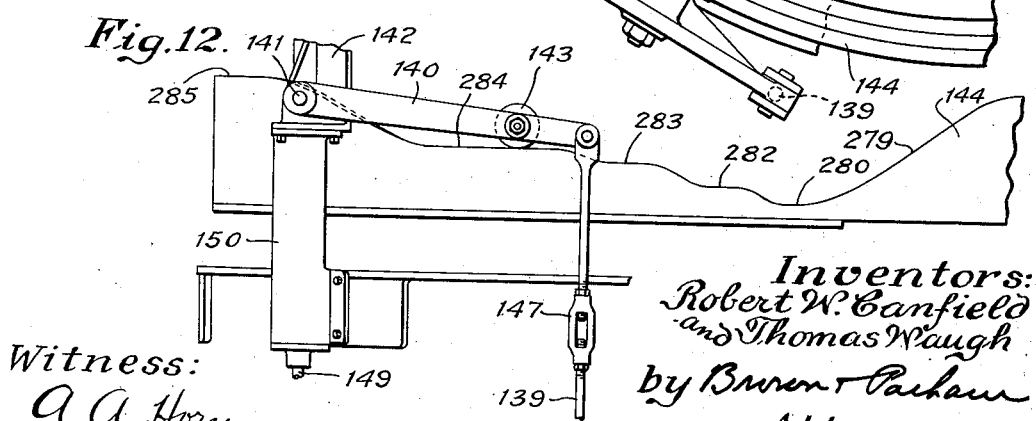

Jan. 25, 1938.  R. W. CANFIELD ET AL  2,106,546
APPARATUS FOR FORMING GLASSWARE
Filed Feb. 14, 1935  9 Sheets-Sheet 5
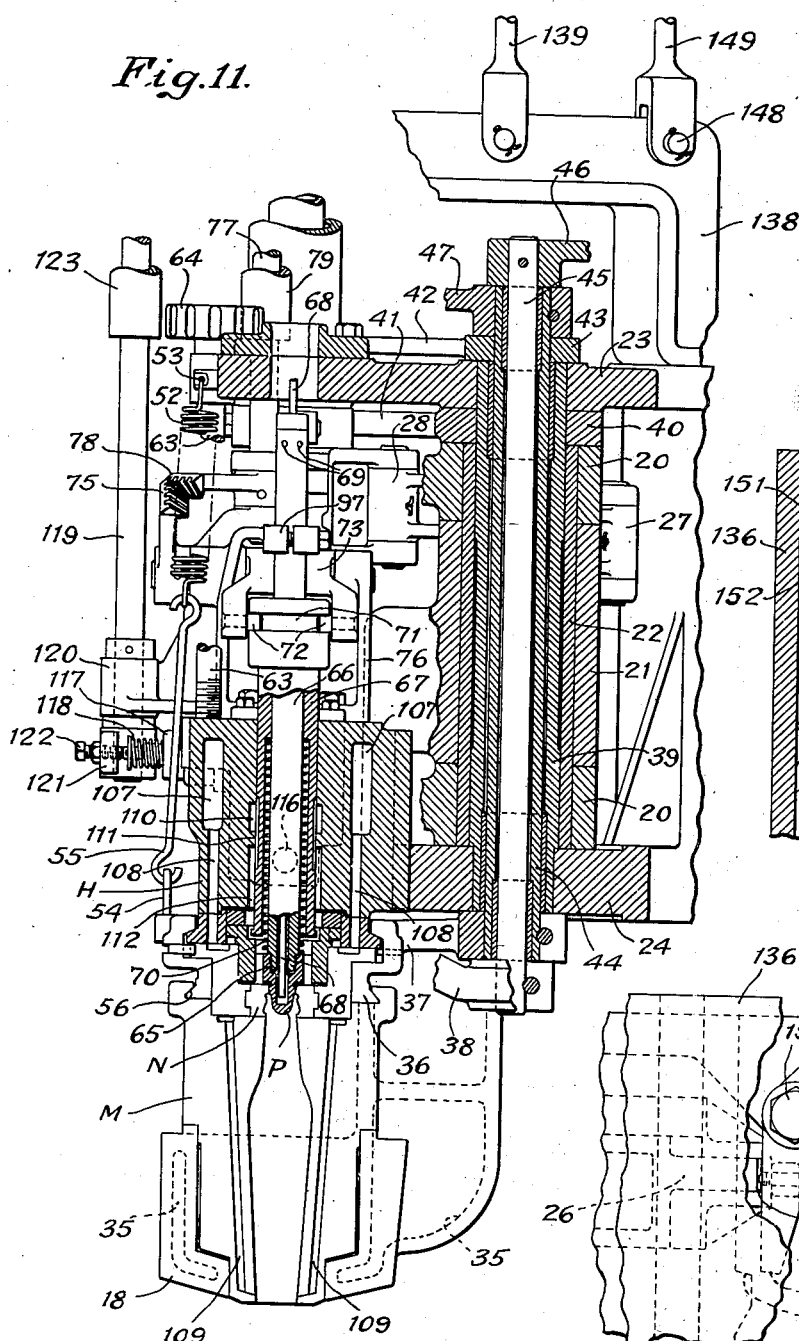
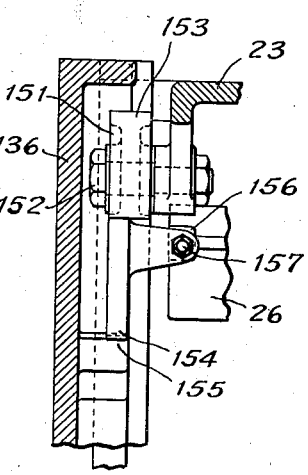
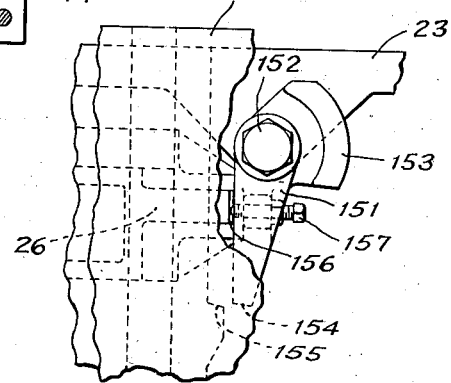
Witness:
A. A. Horn
Inventors:
Robert W. Canfield
and Thomas Waugh
by Brown & Parker
Attorneys.

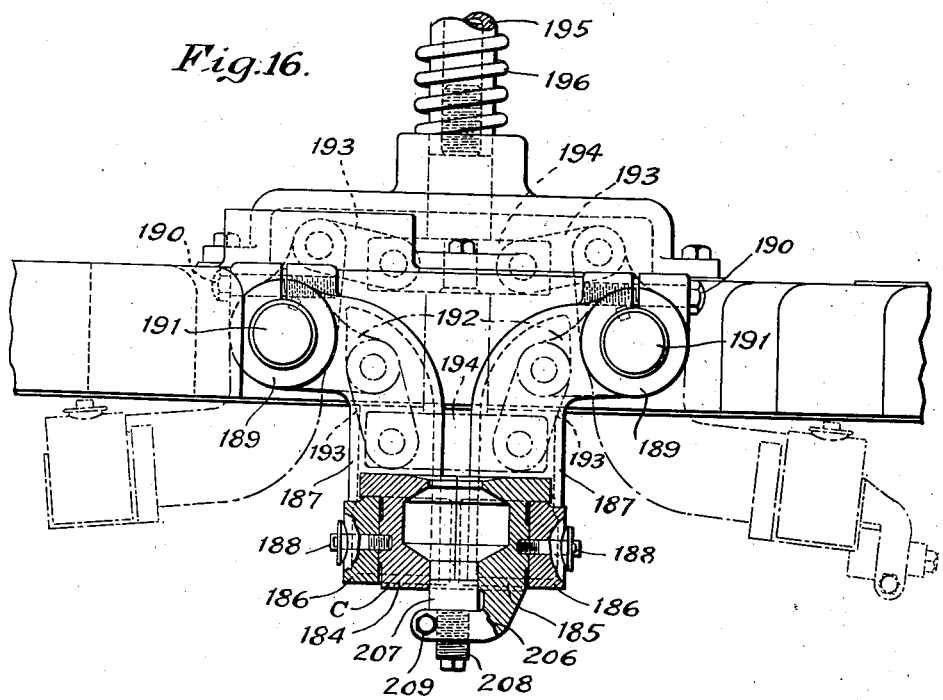

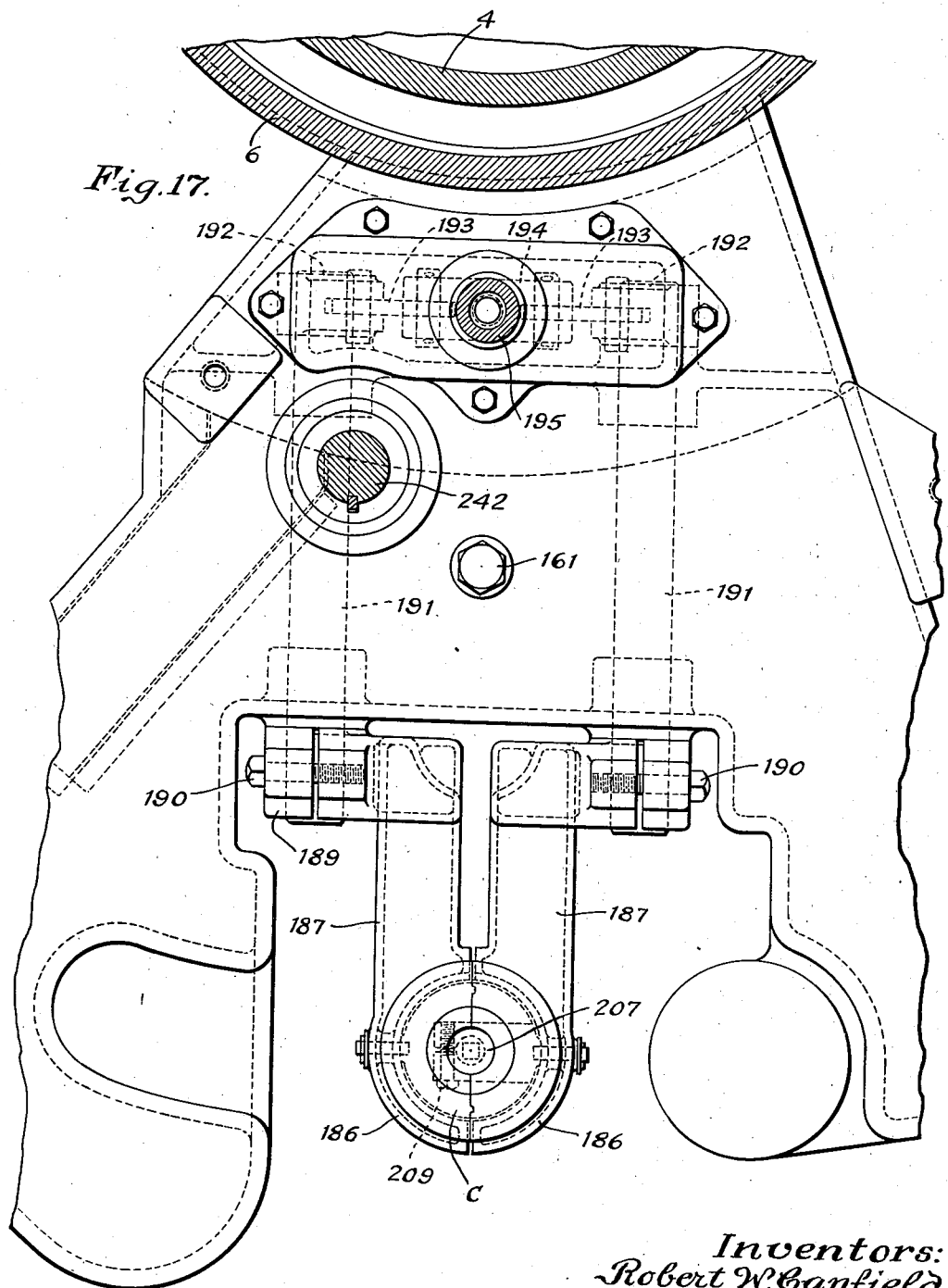

Jan. 25, 1938.　　　R. W. CANFIELD ET AL　　　2,106,546
APPARATUS FOR FORMING GLASSWARE
Filed Feb. 14, 1935　　　9 Sheets-Sheet 8

Witness:
A. A. Horn
W. B. Thayer

Inventors:
Robert W. Canfield
and Thomas Waugh
by Brown & Parlam
Attorneys.

Jan. 25, 1938.   R. W. CANFIELD ET AL   2,106,546
APPARATUS FOR FORMING GLASSWARE
Filed Feb. 14, 1935   9 Sheets-Sheet 9
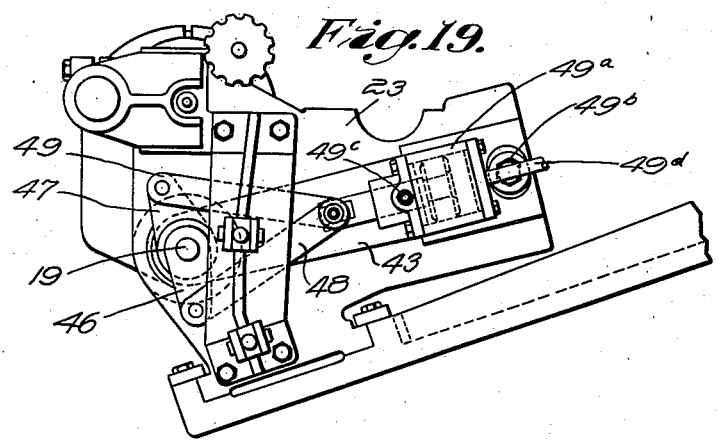
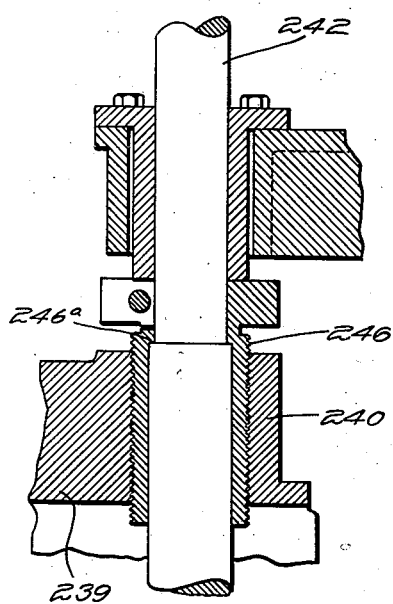
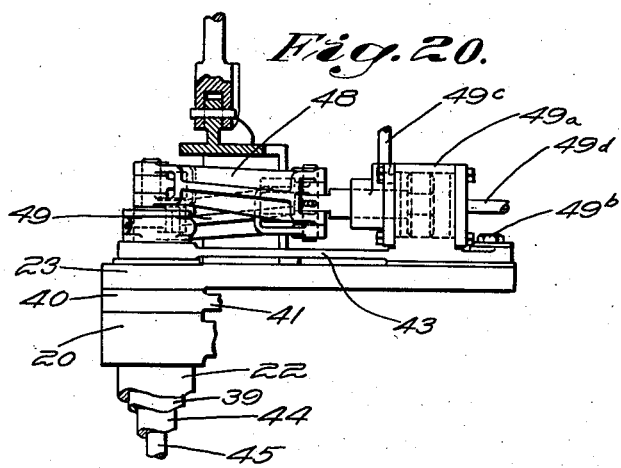
Witness:
W. B. Thauer.
Inventors;
Robert W. Canfield,
Thomas Waugh
by Brown & Parham
Attorneys Patented Jan. 25, 1938

2,106,546

UNITED STATES PATENT OFFICE 2,106,546

APPARATUS FOR FORMING GLASSWARE

Robert W. Canfield and Thomas Waugh, West Hartford, Conn., assignors to Hartford-Empire Company, Hartford, Conn., a corporation of Delaware Application February 14, 1935, Serial No. 6,424

14 Claims. (Cl. 49—5)

This invention relates to the manufacture of glassware, such as containers or other hollow articles, and has particular relation to the manufacture of glassware by the "fill and empty" method, as disclosed, for example, in the patents to George E. Rowe, No. 1,956,203, and Karl E. Peiler, No. 1,955,765, both granted April 24, 1934.

Certain phases of our present invention have somewhat broader utility than in the practice of "fill and empty" method for which the machine as a whole is particularly designed, as will be apparent from the consideration of the features of invention presently to be pointed out and from the appended claims. Inasmuch, however, as the machine of our present application has particular utility in connection with the "fill and empty" process, this process will be described as a primary use of the machine, although it will be understood that certain features are susceptible of other and/or of general use.

A general object of our present invention is to provide novel apparatus for carrying on the manufacture of glassware by the "fill and empty" method.

Among the other and more specific objects of our present invention are:

(1) To provide a measuring cup as set forth hereinafter having an adjustably variable capacity;

(2) To provide means usable generally in suction type glassware forming machines for preventing the dipping of partible molds in the event that the portions of such molds are not fully closed;

(3) To provide means, specifically an oscillating cam, operable in connection with a continuously rotating suction type forming machine for operating shears which are moved, at least during their operating period, in synchronism with the machine, so as to provide a more rapid shearing operation than could be advantageously obtained by the use of a stationary cam;

(4) To provide means, which are susceptible of use in glass forming machines of the suction and other types, by which a bottom plate for a final blow mold is made tiltable in such manner that it is tilted under the action of the movement of the final blow mold in a direction away from its final blowing position and further away from the blank forming position than the final blowing position;

(5) To provide means, more particularly usable in connection with the practice of the "fill and empty" method, for mounting and operating two sets of shearing means, the shears of one set being provided for each mold respectively and moving with the molds and the shears of the other set oscillating to cooperate with each mold of a series of molds mounted on a continuously moving mold carrier in succession;

(6) To provide means, usable generally in connection with glassware forming machines and particularly those of the suction type, for insuring a substantially air-tight connection between a mold and its cooperating neck ring;

(7) To provide means, particularly useful in connection with the "fill and empty" method, by which the hollow blank, once it has been formed as above generally described according to the "fill and empty" method, may be vented to the atmosphere, so as to prevent the undue expansion or collapsing of the blank thus formed;

(8) To provide in connection with a continuously rotating machine, which may in certain instances be of the suction type and/or be for use in connection with the practice of the "fill and empty method", for effecting certain running adjustments of the timing of certain operations, so that these adjustments may be made during the continuous operation of the machine;

(9) To provide apparatus by which the "fill and empty" method may be carried on in such manner as to include in the automatic operation of the machine an "overlapping cycle", that is, a cycle of operation in which the blank forming and final blowing or the containing of a charge of glass in a blank mold while a semi-formed article made from the previous charge is contained in a corresponding final blow mold may be effected at one and the same time;

(10) To provide means, usable generally in suction type machines, by which the suction head and/or the final blow mold may be vertically adjusted, so as to compensate for the use of blank molds of various types and sizes; and

(11) To provide a peculiar and novel mounting and operating means for the measuring cup or receptacle associated with the blank mold, usable in a "fill and empty" method of the suction type, to permit of the lowering of the suction mold into glass-gathering ring relation with a pool of molten glass between the open halves or mating portions of the measuring receptacle.

Other and more detailed objects of the present invention will become apparent from the reading of the following description of a preferred embodiment of the same, and from the appended claims, all when taken in conjunction with the accompanying drawings in which:

Figures 1 to 7 inclusive illustrate various steps of the "fill and empty" method;

Fig. 8 is a view in side elevation of substantially the entire machine to carry out the method in operative relation to a gathering pool for molten glass;

Fig. 9 is a view substantially in vertical section of one-half of the machine of Fig. 8 with the upper portion and parts of the machine support and drive omitted;

Fig. 10 is a fragmentary view in plan of one of the forming units of the machine;

Fig. 11 is a fragmentary view principally in vertical section on the line 11—11 of Fig. 10 illustrating the mounting of the blank mold, neck ring and the internal construction of the head associated therewith;

Fig. 12 is a fragmentary view in side elevation showing certain of the mechanism for raising and lowering the dipping frame and a partial development of the cam by which these movements are controlled;

Fig. 13 is a fragmentary view substantially on the line 13—13 of Fig. 10, illustrating in detail the safety mechanism for preventing lowering of the dipping frame if the blank mold is not fully closed;

Fig. 14 is a detailed fragmentary view taken at right angles to the illustration of Fig. 13 and with parts broken away showing the same mechanism;

Fig. 15 is a fragmentary view principally in vertical section of certain of the timing means for the operating parts of the machine;

Fig. 16 is an enlarged view partly in elevation and partly in vertical section of the measuring receptacle for glass and certain of its operating means;

Fig. 17 is a fragmentary view partly in horizontal section and partly in plan of the measuring receptacle and its support and a portion of its operating means;

Fig. 19 is a fragmentary plan view showing the neck ring opening and closing mechanism;

Fig. 20 is a fragmentary view principally in elevation, showing the mechanism of Fig. 19; and Fig. 21 is a fragmentary view principally in vertical section showing the means for vertically adjusting the position of a final blow mold.

*"Fill and empty" method*

The "fill and empty" method may be performed either manually or automatically by the use of devices such as are shown in Figs. 1 to 7 inclusive. These include a suction body mold M, a neck mold N associated therewith, a neck plunger P and primary shears S.

Figure 2:
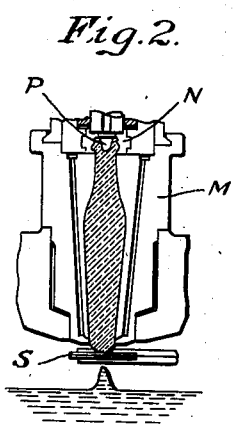

First the mold M is charged by suction from the surface of a gathering pool of glass and the tail is severed by the shears (Fig. 2). It is preferred to sever the glass by means of a pair of shears rather than a single blade, although a single blade may be employed if desired. The severing is preferably effected by operating shears S in a plane spaced slightly below the bottom of the mold M to avoid smearing.

Subsequent to the shearing as aforesaid, the plunger P is withdrawn from the initial cavity it forms, after the proper contact period. After the walls of said cavity have reheated and become plastic, the charge of glass is ready for the emptying operation to make it hollow. At about this time, a measuring receptacle C has been moved into glass-tight engagement with the bottom of the mold M and in registry with the opening at the lower end of that mold. The receptacle C is preferably formed in sections mounted in holders so that it may be opened and closed. The receptacle C in its operative position constitutes a continuation of the cavity of the mold M and is closed at its bottom.

Figure 3:
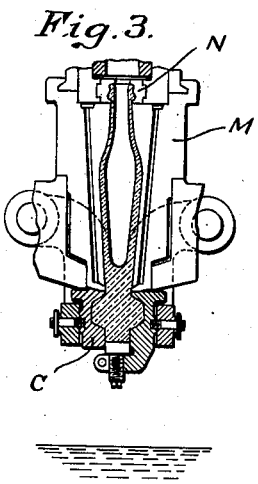

"Empty blow" air pressure is now introduced into the initial cavity as formed in the glass by the plunger P, causing the plastic interior portion of the charge of glass to flow into and fill the receptacle C. The result of this operation is illustrated in Fig. 3.

The receptacle C predetermines the amount or volume of glass expelled from within the mold M, and thereby predetermines the volume of the bubble or cavity in the charge of glass remaining in the mold, which in effect also predetermines the weight of glass remaining in the mold M. The glass remaining in the mold is distributed evenly around the walls thereof in a manner best suited to the production of finished ware having a desired glass distribution in the walls.

The capacity of the receptacle C is preferably selected in accordance with the design of the parison or blank mold M, which in turn depends upon the article being made. The capacity of the receptacle C may be varied by means of an adjustable bottom as will be more fully set forth hereinafter, although once the capacity suited to the particular parison mold has been ascertained, no further adjustment is normally necessary. In making ware of various sizes and/or weights, receptacles of proportionately different volumes are or may be used. Preferably the volume of the receptacle C is such that the cavity or bubble terminates above the severing plane. This prevents the incorporation of bubbles or blisters in the emptied portions or slugs of glass, so that they may be more readily assimilated into the glass bath to which they are discharged and that glass be quickly reheated and conditioned for further glass forming operations.

An opening is preferably provided in the bottom of the receptacle C to vent any trapped air therefrom at the time the glass is forced thereinto, and/or such air may be allowed to escape through the joint between the receptacle and the mold if desired.

It may in some instances be desirable to maintain the application of vacuum to the exterior of the charge from the time of gathering until after the "empty blow", but this is not shown and is in fact not provided in the machine specifically to be described hereinafter. In the usual case, the glass has been sufficiently stiffened by the chilling action of the mold to hold it in place during the "empty blow", which also tends to hold the glass in contact with the walls of the mold M.

After the process has proceeded up to the point illustrated in Fig. 3, the slug of glass in the receptacle C must be severed from the hollow body remaining in the mold M. This is accomplished by first effecting a relative vertical movement between the mold M and the receptacle C for the purpose of attenuating the connection between the glass in the mold and the slug of glass in the receptacle. The connection when sufficiently necked in is severed by secondary shears S' (Fig. 4), thus completing the formation of a hollow blank or parison of the desired weight in the mold M. The shears S' also preferably are used in lieu of a single blade and operate to sever the glass in a plane spaced slightly below the bottom of the mold M.

Figure 5:
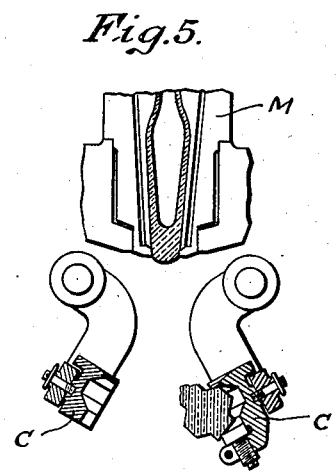

The receptacle C is thereafter opened to discharge the slug of glass therefrom (Fig. 5). It is preferred that the slug be dropped at one side of or outside the gathering zone, as for example into a separate channel leading back into the tank or into a cullet chute.

Air is preferably vented from within the hollow body of glass at a desired time to avoid undue expansion or collapsing of the parison or blank. This venting may take place prior to, during or after the second severing operation as desired.

When a two-mold method of operation is to be employed, the parison or blank formed as above set forth is transferred to a final blow mold F, and blown to final form therein in any desired manner, although preferably the neck ring is removed from about the neck of the parison or blank before the final blowing is carried on. The blow head B may be used to supply final blowing air to the article within the final blow mold.

The "fill and empty" process may be carried on by apparatus other than that disclosed in the accompanying drawings, as illustrated for example in the patent to Rowe, No. 1,902,140, granted March 21, 1933, and also may be practiced by the use of a single mold rather than the two-mold method particularly to be described hereinafter. Inasmuch as the present invention relates primarily to a particular machine for carrying out this and/or other processes, no further discussion will be given of such modifications.

*The machine, supporting structure and rotating means*

The machine of our application is illustrated as a whole in Fig. 8 and is of the single table, continuously rotating type. It will be understood, however, that certain features of our invention may also be applied to multiple table machines and/or to intermittently rotated machines. In fact certain of the features of our invention may also be incorporated in what may be termed a stationary type machine.

As shown particularly in Fig. 8 of the accompanying drawings, the machine is mounted upon a main base 1, which is provided with suitable wheels 2, which may be run on tracks (not shown) or on the factory floor as may be desired. On the base 1 is arranged a pedestal 3 which carries at its upper portion a stationary hollow column 4 (Fig. 9). At its upper end the hollow column 4 is provided with an extension 5 for supporting suitable cams in a manner hereinafter more particularly to be described. The parts may be secured together in any suitable manner as by bolts, welding, etc. The details of these connections form no part of the present invention and hence, they will not be illustrated or described more particularly.

Surrounding the hollow column 4 is a hollow rotatable member 6, the weight or thrust of which is supported upon ball bearings illustrated best at 7 (Fig. 9), or in any other desired manner, the member 6 having a cylindrical bearing upon the column 4.

Means are provided for rotating the member 6 continuously, such means in the present instance comprising a prime mover here shown as an electric motor 9, Fig. 8, which is connected by a suitable sprocket chain 10 to a speed changing device 11, here shown merely in outline. This speed changing device may be the well-known "Reeves" drive, but it will be understood that any other suitable or equivalent device may be used in place thereof. Power is transmitted from the speed changing device 11, through a sprocket chain 12 to a gear box shown generally at 13, within which are suitable reducing gears (not shown) by which power is transmitted to a short vertical shaft 14 carrying at its upper end a pinion 15 which meshes with and drives a large ring gear 16, which is rigid with the rotatable member 6. Thus power is continuously transmitted from the motor 9 to the mold carrier for rotating it continuously.

Suitable overload throw-out or safety devices (not shown) may be incorporated into the power drive as desired, but as these devices have become well known in the art, it is throught not necessary to illustrate them.

*Blank molds M, mounting, and opening and closing means therefor*

The machine of our invention as shown includes six similar forming units, but inasmuch as these units are each a duplicate of the others, only one will be described.

As above generally set forth, each of the forming units of our machine includes a suction blank mold M, these molds being best illustrated in Fig. 11 and being formed in mating portions or halves supported interchangeably in mold holders in the well known manner. The mold holders are illustrated at 18 and are arranged for pivotal movement about the vertical axis of a pintle indicated generally at 19 (Fig. 10). Specifically the mold holders are supported one with a pair of spaced bearing members illustrated at 20 (Fig. 11) and the other with an elongated bearing member 21. The bearing members 20 and 21 are journaled about a common sleeve 22 which extends between spaced members 23 and 24 to which the various elements which are arranged concentrically about the axis 19 are pivoted in a manner hereinafter to be more specifically described. The members 23 and 24 are rigid with each other and form a part of a dipping frame, which will be referred to further as the description proceeds.

The blank mold operating means also is carried by the dipping frame, including members 23 and 24 and in the present instance comprises a pneumatic cylinder illustrated at 25, Fig. 10. This cylinder may be rigid with the dipping frame, or may be carried in some floating relation thereto, in a manner not clearly illustrated in the accompanying drawings. For the purposes of the present description, however, the cylinder 25 may be considered as rigid with the dipping frame, as any variations from this construction are not material to our present invention.

The cylinder 25 is provided with the usual piston and piston rod extending substantially radially outward of the machine and carrying at its outer end a yoke illustrated at 26 in dotted lines in Fig. 10. Portions of this yoke are also illustrated in Figs. 13 and 14. The ends of the yoke 26 are connected by short links 27 and 28 (Figs. 10 and 11) to cranks formed on the bearing member 21 and the upper bearing member 20 respectively. Thus the radial outward movement of the piston within the cylinder 25 will be effective to open the blank mold M, while radial inward movement of this piston will close this mold.

Means are provided, including suitable valves and pneumatic pressure passages, for supplying pressure to operate the blank mold opening and closing cylinder 25 and for other operations, the pressure passages not being shown in detail and the valve block including the several valves being merely shown in outline at 29 (Fig. 15). As shown in that figure, a rocker member 30 is freely pivoted about a vertical pintle shaft 31 and provided with a pair of spaced cam rollers 32 cooperating with suitable cams which are adjustably secured in grooves 33 on a cam drum 34 for operating the valve for supplying and exhausting pressure to the opposite ends of the cylinder 25. The cam drum 34 is preferably rigid with the upper extension 5 of the stationary hollow column 4 of the machine. It will be understood that the cams employed in conjunction with the cam rollers 32 may be positioned at any desired point or points around the grooves 33 and are adjustable at will, so as to cause the associated operations to occur at the desired times. This construction is, however, well known and is employed in certain patented devices, for example as the machine shown in the patent to Canfield, one of the present co-inventors, No. 1,878,465, granted Sept. 20, 1932.

It will be noted that the mold holders 18 for the blank molds are provided with hollow cored out portions shown at 35, and means are preferably provided for circulating water or some other cooling medium through these hollow portions. Inasmuch, however, as the water cooling means form no necessary part of our present invention, we have not shown these means in greater detail than the showings on Figs. 9 and 11.

Means are preferably provided in connection with cylinder 25, which operates the blank mold, for cracking the blank mold prior to the full opening thereof, so as to initiate the reheating of the blank formed in this blank mold. Such means are not illustrated in detail in the accompanying drawings but preferably are of substantially the same general type of construction as that illustrated and described in the patent to Ingle, No. 1,911,119, granted May 23, 1933.

*The neck ring mounting and operating means therefor*

Each blank mold M is provided with a neck ring N, as above generally set forth, these neck rings each being formed in complementary portions or halves, as in the usual construction, and the halves being mounted interchangeably in suitable holders 36 (Fig. 11). The neck ring holders 36 are provided respectively with arms 37 and 38 rigid or integral therewith, which arms are mounted for pivotal movement to open and close the neck ring about the same vertical axis about which the blank mold is closed, so as to insure registry of these parts.

Inasmuch as the construction of the various parts arranged concentrically with the axis 19 is somewhat complicated, a particular description thereof will be given at this time. As above stated, the bearing elements 20 and 21 for the blank mold holders are carried by a sleeve 22 which is axially coextensive therewith. Within the sleeve 22 and extending between the dipping frame members 23 and 24 is a sleeve member 39 which is preferably rigidly secured in the frame members 23 and 24. Intermediate the upper end of the sleeve member 22 and the upper bearing member 20 on the one hand and the upper frame member 23 on the other is a member 40 received around the rigid sleeve member 39. This member 40 is provided with an arm 41 which serves in the support of the blank mold operating cylinder 25 in a manner not fully illustrated herein and which has no specific connection with the present invention. A somewhat similar arm member 42 also has a bearing portion 43 above the member 23 and serves in supporting the neck ring operating cylinder, Figs. 19 and 20.

Journaled within the sleeve member 39 is a rotatable sleeve member 44 to which the neck mold holder arm 37 is rigidly secured, and journaled within the sleeve member 44 is a solid rod or shaft 45, which is rigidly secured at its lower end to the other neck mold holder arm 38 as shown. At their upper ends the shaft 45 and sleeve 44 carry respectively crank arms 46 and 47 (Figs. 10 and 11 and 19) to which are connected respectively links 48 and 49. Links 48 and 49 are pivotally connected to the piston rod of a pneumatic cylinder 49$^a$, which is secured as shown on Figs. 19 and 20 to the outer end of the arm 43. This arm is suitably adjustably connected to the member 23 as by a bolt 49$^b$ extending through a laterally elongated slot in the arm 43 and threaded in the member 23. Pressure may be admitted to the opposite ends of the cylinder 49$^a$ to actuate the piston therein through suitable passages indicated at 49$^c$ and 49$^d$ from a pressure control mechanism presently to be described.

Pressure to the opposite ends of the neck ring opening and closing cylinder 49$^a$ is preferably controlled by one of the valves in the valve chest 29 (Fig. 15), which is in turn controlled by a rocker member 50 journaled co-axially with the rocker member 30 and controlled in its angular movements by a pair of spaced cam rollers 51, which cooperate with suitable adjustable cams in two of the grooves 33 on the cam drum 34.

Means are provided for each of the neck ring holders to support the neck ring against undesired sagging, due to the weight of superimposed parts, or to other reasons, such means comprising tension springs 52 connected as illustrated in Fig. 11 between anchorages 53 on the dipping frame member 23 and suitable points, as shown at 54 on each of the neck ring holders. As shown, there is a link member 55 connected between an eye on the neck ring holder and the lower end of the spring 52, so as to permit the use of a shorter spring. It will be understood that each of the neck ring holders is provided with a similar spring support at its outer end.

Means are provided for securing a substantially air-tight joint between the neck ring N and the blank mold M when both are closed, such means comprising a shoulder having a beveled surface 56 (Fig. 11), which is formed rigid with the neck ring, in this case on the neck ring holder 36, and a complementary beveled surface formed in this instance on a part of the blank mold. The effect then of closing the blank mold about the neck ring holder will be to move the blank mold and neck ring toward each other, so as to provide a substantially air-tight joint therebetween.

*The head, adjusting means therefor, pressure and vacuum apparatus associated therewith*

There is illustrated at H, a head through which vacuum and pressure are supplied to the blank mold M and neck ring N, this head being also mounted on the dipping frame hereinafter to be more specifically described so as to move with the blank mold and neck ring. The head H is supported by the dipping frame in two ways:

in the first place, the head is provided with a dovetail member 57 (Fig. 9) which is received in a suitable slot or guideways 57ª on the dipping frame, (Fig. 8). Means may be provided as desired for clamping the dovetail 57 in its associated guideways, but such means are not here illustrated. The head H is also provided with a vertical shaft 58 (Figs. 9 and 10) integral or rigid therewith. In the present instance the shaft 58 is clamped to the head H by a pair of bolts illustrated at 59. The shaft 58 passes upwardly through a split collar portion 60 in a bracket 61 rigid with the dipping frame, the shaft 58 being adjustably clamped in this bracket by means of a clamping screw 62.

Means are provided for adjusting the head H vertically in respect to the dipping frame in order to compensate for molds of different heights. For this purpose, a screw shaft 63 (Fig. 11) is provided threaded into the head H at its lower end and swiveled in a part of the upper dipping frame member 23. Above this member, the shaft 63 is provided with a collar for preventing downward movement thereof and a hand wheel 64 (Figs. 10 and 11). Thus when the clamping members (if such be used) associated with the dovetail 57 and the clamping screw 62 are loosened, the head H may be vertically adjusted by rotation of the hand wheel 64 to bring it to a new desired position, after which the clamping screw 62 and such other clamping means as are provided may be tightened to retain the head H in a predetermined position in respect to the dipping frame.

The neck plunger P is carried movably by the head H, as best illustrated in Fig. 11. The lower end portion of this plunger, which is the glass contacting portion, is interchangeable and is preferably threaded as illustrated at 65 to the lower end of a vertical shaft 66 which is arranged for sliding movement within a sleeve member 67, the latter being in turn arranged for sliding movement in a vertical bore in the head H.

Means are provided for cooling the neck plunger P, such means in the present instance comprising a small diameter tube 68 passing down concentrically through a bore in the shaft 66 to the interior of the plunger P as shown. Sufficient clearance is provided around this tube for the exit of the cooling air which is permitted to escape through holes shown at 69 adjacent to the upper end of the shaft 66. It will be understood that cooling air from any suitable source may be transmitted by means not shown to the upper end of the tube 68.

Means are provided for moving the plunger P to and from its operative position, shown in Fig. 11, in cooperation with the neck ring N. In the first place, a compression spring 70 is arranged about the lower portion of the shaft 66 and extends between a shoulder formed by the upper end of the interchangeable neck plunger member P and an inner shoulder formed by the upper end of a counterbore in the lower portion of the sleeve 67. Thus, force imparted to the sleeve 67 to move it downwardly will be transmitted through the spring 70 to the neck plunger P to retain the latter resiliently in its lowermost position in respect to the sleeve against a suitable stop which may be a part of the neck ring or its holder. The sleeve 67 is provided adjacent to its upper end with an enlargement in which is a circumferential groove 71 arranged to receive inwardly projecting pins 72 secured in the outer bifurcated ends of a lever 73 (Figs. 9 and 11). The lever 73 is secured to a horizontal rock shaft 74 which also carries a segmental gear 75, the rock shaft being pivoted in a bracket 76 secured to a part of the head H. In an extension of the bracket 76 is journaled the lower end of a vertical rock shaft 77 which carries secured thereto a segmental gear 78 meshing with the gear segment 75. The shaft 77 is splined and telescopically received in a hollow shaft 79 which is journaled in suitable bearings in an upper frame member 80 rotating with the rotatable mold carrier, but not partaking of the vertical movements of the dipping frame. The upper end of the hollow shaft 79 is further journaled in a plate-like member 81 which is a part of the upper portion of the rotating mold carrier and which carries the valve chest 29 as illustrated in Fig. 15. Referring to this figure, the hollow shaft 79 carries adjacent to its upper end a crank 82, which is connected by a link 83 to a crank 84 secured to the lower end of a hollow sleeve which is concentric with and surrounds the pintle 31, on which sleeve and pintle the rocker members 30 and 50 above referred to and operating certain of the valves in the valve chest are journaled.

At its upper end, the hollow sleeve to which the crank 84 is secured carries a rocker member 85, which in turn carries spaced cam rollers 86 and 87. Cam roller 86 is in alignment with two superposed cams 88 and 89 which are mounted respectively on rotatable supports 90 and 91. Cam roller 87 is arranged to cooperate with a fixed but adjustable cam 92 secured to a stationary support 93 carried by the upper stationary column extension 5.

The rotatable members carrying supports 90 and 91 are normally held stationary, but may be independently adjustably rotated by similar mechanism around the central axis of the center column of the machine for adjusting their associated cams. For this purpose, the inside of the annular supporting member 91 is provided with gear teeth meshing with gear 94 on a vertical shaft 95 which is suitably journaled in bearings, one of which is shown at 96. Means (not shown) are provided for rotating shaft 95 from outside the machine during the operation thereof to rotate cam 89 to a desired adjusted position. Similar means (not shown) are provided for adjusting cam 88. In view of the fact that shaft 95 is inside the stationary column members 4 and 5, it will be seen that well known mechanism may be provided for rotating this shaft at the time the machine is in operation. According to the preferred method of operation, cam 92 is effective primarily for rocking the rocker member 85 to move the lever 73 and hence the sleeve 67 vertically. The primary purpose of cams 88 and 89 will be hereinafter described.

In withdrawing the neck plunger P from its operative position, the lever 73 is swung in a clockwise direction, as seen in Fig. 9, which raises the sleeve member 67, this lightening the compression on the spring 70. This action goes on until the upper end of the sleeve member 67 engages beneath a fixed but adjustable collar 97 secured to the shaft 66 (Fig. 11) which will then be positively moved to withdraw the plunger P. On the reverse action, the member 67 will be positively moved downward through the mechanism above described and the plunger P lowered through the intermediation of the compression spring 70 which is employed to predetermine the pressure effective on the plunger.

Means are provided for conducting vacuum to the head H and for controlling the application of vacuum through the head to the mold M and the neck ring N. In the present instance, vacuum is conducted to each unit of the machine in any suitable manner (not shown), through the pipe 98 (Fig. 9), this pipe having a downwardly extending portion 99 which is telescopically received in a pipe section 100, the latter of which is arranged to move vertically with the head H and the dipping frame. Suitable means including a gland packing 101 are provided for preventing leakage of atmospheric air into the vacuum pipes 99 and 100. The pipe 100 is also arranged for vertical adjustment with the head H and in respect to the dipping frame by passing it through a suitable split bearing portion 102, wherein it is secured in adjusted position by means of a pair of bolts shown in section at 103. The head H is cored out as indicated at 104 and this cored-out portion communicates with the pipe 100. A valve 105 is located in the head H for controlling the application of vacuum through the head to the mold as shown, this valve being mounted on a stem which extends through a bearing portion in the upper part of the head and is provided above the head with a compression spring 106 extending between the upper side of the head and a suitable washer or other abutment mounted on the valve stem, the spring 106 tending at all times to close the valve. The valve 105 controls communication between the cored-out part 104 of the head which is at all times open to the vacuum pipe 100 and the cored-out section illustrated at 107 in Figs. 9 and 11.

Referring now to Fig. 11, the cored out portion 107 communicates through vertical passages 108 with the vacuum grooves 109 in the mold M through passages (not shown) in the neck ring N or its holder. The cored-out portion 107 in the head H also communicates through a suitable passage as illustrated in Fig. 9 with an annular groove 110 in the bore in which the sleeve 67 slides. The sleeve 67 is provided with one or more longitudinally extending grooves 111, which in the lowermost or operative position of the sleeve and neck plunger, as shown in Fig. 11, communicate between the groove 110 and an enlarged portion 112 or counterbore surrounding the lower end of the sleeve 67, this portion 112 communicating through passages illustrated in Fig. 11 around the body of the neck plunger P with a relatively narrow space intervening between the neck plunger P and the neck ring N, so that at the time the parts are in the position shown in Fig. 11, vacuum is conducted from the groove 110 through the grooves 111 and space 112 to the inside of the neck ring N around the neck plunger P, all under control of the single vacuum valve 105.

Means are provided for opening and closing the valve 105 to admit and cut off vacuum through the head H to the mold. In the present instance, these means are combined with means for raising and lowering the neck plunger P, which have previously been described. As shown in Fig. 9, the lever 73 is provided with an adjustable abutment screw 113 arranged to engage the upper end of the stem of valve 105, so that when the lever 73 is swung to a position to move the neck plunger to its operative position, further movement of the lever in the same direction will be effective to open the valve 105 to admit vacuum to the head. When, on the other hand, it is desired to cut off vacuum, this may be done by a relatively short clockwise movement of the lever 73 (as seen in Fig. 9), which permits the valve 105 to be closed by the spring 106 prior to the retraction of the neck plunger P. Further clockwise movement of the lever 73 will be effective to withdraw the neck plunger as above set forth.

We preferably arrange the apparatus so that the cams 88 and 89 are principally effective to control the valve 105 through the apparatus above described, the cam 92 being sufficiently relieved to permit such action to take place. During the time the valve 105 is being operated, the spring 106 serves to hold the cam roller 86 against cams 88 and 89. Thus by the apparatus illustrated and hereinabove described, it is possible independently to control the application and cessation of vacuum through the head H to the mold and these two adjustments may be each made independently of the other and during the time the machine is in continuous operation.

Means are also provided in association with the head H for supplying pressure for the "empty blow" illustrated in Fig. 3 and above discussed generally. For this purpose, pressure is conducted in any suitable manner (not shown) to a valve indicated diagrammatically in dotted lines at 114 (Figs. 9 and 10), the pressure being conducted to this valve through a pipe indicated at 115 (Fig. 9). From this valve pressure may pass when the valve is open, through passages illustrated in dotted lines in Fig. 9 to a cored-out portion 116 in the head H, the terminus of which is indicated by the dotted circle in Fig. 11. This pressure passes directly to the annular space 112 shown in Fig. 11 and thence around the sleeve member 67 and the intervening space between the neck plunger P and the neck ring N into the mold to force the hot central core of the glass downwardly out of the mold as above generally described.

Subsequent to the cessation of the application of pressure for the "empty blow" as above set forth, it is desired to vent the interior of the glass to the atmosphere. For this purpose we have provided a valve controlled vent illustrated in dotted lines at 117 in Figs. 9 and 10 and also illustrated in Fig. 11. The details of valves 114 and 117 are not illustrated, but they may be assumed to be of the same general type as the valve 105. The stems of these valves are shown projecting from a valve housing and are surrounded by springs as illustrated particularly in Fig. 11 at 118 for the valve 117, the springs tending at all times to close their associated valves. It will be understood that the valve 117 communicates through the passages shown in dotted lines in Fig. 9 with the cored-out chamber 116 in the head H, so as to vent the interior of the glass through the same passages through which pressure was supplied thereto and thereby to prevent undue expansion or collapsing of the hollow body of glass within the mold M.

Means are provided for operating the valves 114 and 117. In the present case, we prefer to provide a common means for operating both valves, that means to be arranged in such a way that either valve may be opened and/or fully closed while the other valve remains closed, but such that only one valve can be opened at a time. For this purpose, we have provided a vertical shaft 119 suitably journaled in bearings such as that illustrated at 120 (Fig. 11) in parts carried by the dipping frame, the shaft 119 having at the lower end wing members as illustrated at 121 through which are threaded adjustable abutment screws 122 (Figs. 10 and 11), the screws being aligned respectively with the stems of valves 114 and 117. Thus if the shaft 119 is rocked in one direction or the other, one or the other of the valves 114 or 117 will be opened and closed according to the direction of rocking of the shaft. The shaft 119 is telescopically received and splined in a hollow shaft 123 similar to the hollow shaft 79 and provided with a crank 124 at its upper end as shown in Fig. 15. This crank is connected by a link 125 to a crank 126, which is secured to the lower end of the central pivotal shaft or pintle 31 about which the various rockers and rocker arms are journaled. At its upper end the shaft 31 carries a rocker member 127 provided with spaced cam rollers 128 and 129 cooperating respectively with cams 130 and 131. Cams 130 and 131 are arranged to be rotatably adjusted about the axis of the central sationary column by means similar to the vertical shaft 95 and gear 94. As shown, the cam 131 is mounted on a support having internal gear teeth which mesh with wear 132 which is mounted on a shaft 133. The adjusting means for cam 130 are not illustrated in the accompanying drawings but are similar to those illustrated and described.

We contemplate an arrangement in which cam 130 in effect controls one of the valves 114 or 117, while the cam 131 in effect controls the other of these valves, so that in practice the supplying of pressure and the venting thereof subsequent to the termination of the pressure supply may each be adjusted as desired during the continuous operation of the machine.

At the time of the "empty blow" or supplying of pressure through the neck ring N, we do not desire that pressure be transmitted to the grooves 109 of the blank mold M. In view of the fact that the vacuum openings for both the neck and the sides of the blank mold are interconnecting as above described, some means are preferably provided for cutting off this communication. In the present instance, we accomplish this purpose by forming the grooves 111 in the sleeve member 67 of such length and so locating them in respect to the annular groove 110 and the counterbore 112 as shown in Fig. 11, that at the time the sleeve 67 and the neck plunger P are raised, the lower ends of the grooves 111 will be above the dividing portion intermediate the annular groove 110 and the counterbore 112, so that pressure supplied to the space 112 will be prevented from passing upwardly into the annular groove 110 and thereby prevented from passing to the grooves 109 in the blank mold M.

*Dipping frame mounting, moving and safety means therefor*

As above set forth, the blank mold M, the neck mold N, and the head H and certain of their operating mechanisms are mounted upon a dipping frame. This frame is arranged for movement in a path having a substantial vertical component. In the present instance, the frame which includes members 23 and 24 as aforesaid, suitably rigidly tied together in a manner not illustrated, is provided with a guide member 134 (Fig. 10), this guide member being received within suitable guideways 135 as shown in that figure. The guideways are formed in a substantially radially extending member 136 which is rigid with and suitably secured to the rotary carrier including the rotatable hollow column member 6.

For moving the dipping frame vertically, this frame is provided with a rigid yoke member 138 (Figs. 8 to 11 inclusive) which is connected by a pivoted link 139 to the outer end of a lever 140, see particularly Figs. 8 and 12. The lever 140 is pivoted at 141 to a bracket 142 which is rotated with the rotating mold carrier. Intermediate the ends of the lever 141 is a cam roller 143 which rides along the upper surface of a stationary cam 144. This cam is suitably mounted as best illustrated in Fig. 15, on an outwardly extending flange of the stationary top member 145 which is secured as at 146 to the upper end of the stationary hollow column extension 5. Fig. 12 shows a partial development of the cam 144 and shows certain different level positions on this cam, the purposes of which will be hereinafter explained in setting forth the cycle of the machine as a whole. Intermediate the ends of the link 139 is a turn buckle 147 which is usable for the purpose of adjusting the vertical position of the dipping frame for a predetermined position of the roller 143 on the cam 144.

Means are provided for counterbalancing a portion at least of the weight of the dipping frame and mechanism carried thereby. In the present instance, such means comprises an air spring associated with each dipping frame. As shown, the yoke or bracket 138 is connected not only to the link 139, but also is pivotally connected at 148 (Fig. 11) to the lower end of a piston rod 149 associated with a cylinder 150 (Figs. 8 and 12), which is secured to the lower portion of the bracket 142. It will be understood that pressure is at all times admitted to the cylinder 150 beneath the piston therein so as to serve as a counterbalance for a desired part of the load on the dipping frame. This in practice relieves the cam 144 of a great proportion of this load and permits a more sensitive control of the raising and lowering of the dipping frame and parts carried thereby.

Means are preferably provided in association with our machine for preventing lowering of the dipping frame to the glass gathering position, unless the blank mold carried by that frame is fully closed. For this purpose, each dipping frame, as shown best in Figs. 10, 13, and 14, is provided with a freely swingable latch lever 151 pivoted thereto on a horizontal pintle here shown as a bolt 152. The lever 151 is counterbalanced by an integral portion 153 thereof tending to move it in a clockwise direction (as seen in Fig. 14) so that the lower end portion 154 of the lever 151 tends to engage over a ledge 155 (Figs. 13 and 14) when the dipping frame is at its uppermost position. As the blank mold is closed due to the radial inward movement of the yoke 26, a portion 156 of that yoke engages against an adjustable stop screw 157 mounted in the lever 151 to move that lever counterclockwise, as seen in Fig. 14, and thus to move the end 154 out of alignment with the ledge 155 to permit the lowering of the dipping frame. The parts are so constructed and arranged that the lever 151 will not be moved to such a position as to disengage the lower portion 154 thereof from the ledge 155 unless and until the blank mold associated therewith is fully closed, so that should the blank mold not be completely closed, the latch formed by the lever 151 will prevent the lowering of the dipping frame even should the cam 144 be relieved to permit such lowering under the influence of gravity.

The primary shears S, mounting, adjustment and operation

As above generally set forth, we provide primary shears S for severing the connection between the glass as initially gathered in the blank mold M from that in the gathering pool, as is usual in suction machines. The operating means for these shears, however, we believe to be novel with us.

Figure 18:
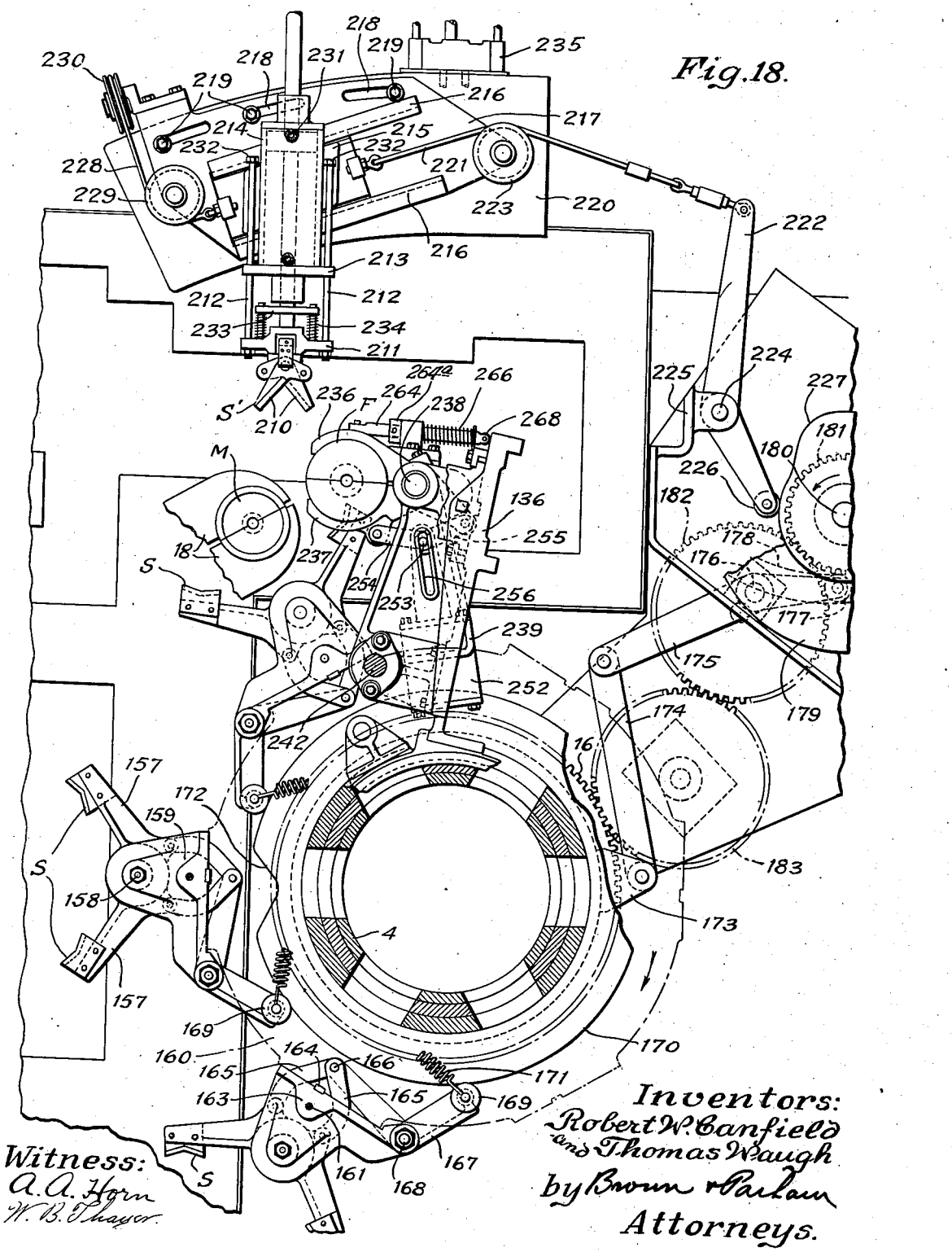
Fig. 18 is a view principally in horizontal section and with parts broken away illustrating the two shear arrangements and their operation.

The shears S, as shown in Figs. 8, 9, and 18, are mounted on the outer ends of arms 157 which are pivoted on a common pintle 158 supported in a bracket 159 which is rigidly but vertically adjustably secured to the lower frame member 160 of the rotating mold carrier.

For vertically adjusting the level at which the shears S operate to sever the glass, there is provided a screw 161 which is swiveled in a rigid portion 162 of the rotatable mold carrier and which may also be rigid or integral with the portion 160 thereof, the bolt 161 extending through and being threaded in a lug 163 of the bracket 159. Thus by rotating the bolt 161 by the application of a suitable tool to the head thereof, the bracket 159 may be raised and lowered vertically to adjust the shears as desired. The bracket 159 is guided in respect to the carrier member 160 by a guiding member 164 rigid with one of these parts and fitting into a recess in the other, the bracket 159 being secured in adjusted position to the member 160 in any conventional manner (not shown).

For operating the shears, each of the arms 157 is connected to a link 165, the ends of which are both connected at a common pintle 166 to one arm of a bell crank lever 167 pivoted intermediate its ends at 168 to a part of the bracket 159. The other arm of the lever 167 carries a cam roller 169 engaging against the outer periphery of a cam 170. A tension spring 171 connects the end of the lever 167 which carries the roller 169 with a suitable anchorage fixed on the rotatable mold carrier so as to cause the cam roller 169 to bear at all times against the cam 170.

The cam 170 is provided with a smaller radius portion or notch indicated at 172 (Fig. 18), so that when one of the rollers 169 rides down into the notch 172, the spring 171 will be effective to close the shears S. In order to permit the design of the cam 170 with gradually varying diameters at the notch 172 rather than abrupt changes in diameter at this zone and at the same time to provide for the rapid shearing action which is desired, we provide for the oscillation of the cam 170 in such manner that at the time a roller 169 is riding down the first incline of the notch into the lower portion thereof for closing the shears, the cam will be moving in a direction opposite to the direction of rotation of the mold carrier. Specifically, the mold carrier will be rotating clockwise as shown (Fig. 18) while the cam 170 will be rotating in a counterclockwise direction.

For oscillating cam 170, this cam is mounted in a manner to be freely rotatable about the axis of the mold carrier and is provided at one portion with a lug 173 which is connected by a link 174 with one arm of a bell crank 175 pivoted on a suitable fixed pintle at 176 intermediate its ends and having at the end of its other arm a cam roller 177 arranged to ride in a closed downwardly facing cam groove 178 in a continuously rotating cam 179. The cam 179 is continuously rotated in synchronism with rotation of the mold carrier, and for this purpose is mounted on a shaft 180 which also carries a gear 181 which meshes with an idler gear 182, this gear in turn meshing with a second idler gear 183, which latter gear meshes with the gear 16 of the mold carrier. Thus the cam 179 will always be driven continuously from the mold carrier so that the cam 179 will impart a desired movement of oscillation to the cam 170.

It will be understood that due to the relatively opposite movements of the cam 170 and the rollers 169, the closing of the shears S will be effected quite rapidly. If desired, the shears S may be retained in their closed position for a predetermined desired length of time by shaping the cam groove 178 so that the cam 170 and roller 169 will move in the same direction and at the same speed while the roller remains at the low portion of the notch 172. Also, it will be understood that the rate of opening of the shears S may be similarly controlled by a proper design of the cam groove 178. Subsequent to the full opening of the shears, that is, after the roller 169 has ridden out of the notch 172, the cam 170 will be rotated in the same direction as the mold carrier to prepare it for its reverse direction of movement for cooperating with the next succeeding shear operating roller 169.

Measuring cup, construction, support and operation

As above set forth generally in connection with the description of the "fill and empty" process, we provide a measuring cup C for receiving the glass forced out of the blank mold M by the "empty blow". As shown in the accompanying drawings, this cup may be and is preferably formed in two mating portions or halves, as best shown in Fig. 16. The halves 184 and 185 of the cup C are interchangeably supported in holders 186 which are provided on the outer ends of arms 187, the halves 184 and 185 of the cup being secured in their holders as shown by the threaded bolts 188. The arms 187 have a particular configuration as shown by comparison of Figs. 8, 9, 16, and 17, for a purpose hereinafter to be described. These arms are provided on their ends opposite that forming the holders 186 with split collars 189 provided with clamping screws 190 to secure them to the outer ends of a pair of horizontal rock shafts 191.

The shafts 191 are suitably journaled in bearings formed in the frame member 162 of the rotating mold carrier as best shown in Fig. 9 and are provided at their inner ends with cranks illustrated in dotted lines at 192, Figs. 16 and 17. The cranks 192 are each connected through a link 193 with a crosshead 194 which is carried by the lower end of a vertical thrust rod 195. Means are provided tending at all times to retain the measuring cup C closed, such means in the present instance comprising a compression spring 196 (Figs. 9 and 16) surrounding the thrust rod 195 and extending between a shoulder formed by the lower bearing for this rod and an adjustable collar 197 secured to the thrust rod 195. The spring 196 always tends to force the rod 195 upwardly which tends to rotate the rock shafts 191 in such directions as to close the measuring cup C.

As shown, the thrust rod 195 passes through an upper bearing 198 (Fig. 9) formed in a bracket secured to the rotatable mold carrier 6, and above this bearing, the thrust rod is disposed below and in alignment with the outer end of a lever 199 which is pivoted at 200 to a bracket 201 depending from the member 80 which is rotatable with the mold carrier. Intermediate the ends of the lever 199 is arranged a roller 202 which is mounted on a horizontal axis and arranged to travel along the downwardly facing cam surface 203 formed on a cam which is carried by a bracket 204 secured to the stationary hollow column extension 5.

The spring 196 in tending to move the thrust rod 195 upwardly thus also serves to retain the cam roller 202 against the cam surface 203. It will be understood that if desired, a suitable type of pivotal connecting means could be employed between the outer end of the lever 199 and the upper end of the thrust rod 195, the simple arrangement shown being used merely for purposes of illustration. By the above described means, the receiving or measuring cup C may be opened positively due to the cam roller 202 riding down a low portion of the cam surface 203 and will be resiliently closed under the action of spring 196 when such action is permitted by the relief of the cam surface 203.

The cam surface 203 is formed upon a cam member 205, which may be interchangeable and which may also be rotated about the axis of the column extension 5 and secured in any desired adjusted position in respect to its support (bracket 204). Due to the provision of this adjustment, the cup C may be operated in its opening and closing movements at any desired times.

The cup C may be provided with a bottom, separate from the sides thereof, and separately supported in some manner. In the present instance, however, I have shown one of the halves 185 being provided with a bracket 206 (Fig. 16) formed with a split collar gripping portion at its lower end. This bracket supports the bottom 207 for the cup C, which is provided with a threaded stud 208 at its lower end passing through the split gripping portion of the bracket 206. When it is desired to vary the capacity of the cup C within certain limits, the bottom 207 may be vertically adjusted by threading the stem 208 up or down in respect to the bracket 206, the desired adjustment being retained once it has been made by tightening a clamping screw 209 in the split collar portion of bracket 206.

We also preferably provide an escape for the air which may be trapped in the measuring cup C at the time glass is being forced thereinto by the "empty blow". For this purpose, there may be a slight clearance space (too small to appear on the drawings without undue distortion of the scale thereof) provided intermediate one or both halves of the cup and the bottom 207, or between the halves of the cup itself or even intermediate the cup and the mold. Any or all of these means for venting the trapped air may be resorted to as may be desired.

Due to the fact that the arms 187 are shaped as shown in the accompanying drawings and that the shafts 191 are spaced apart a material distance, it is possible to open the mating portions of the cup C to such an extent that the blank mold M may be lowered between them in moving it by the lowering of the dipping frame to the gathering position of the mold. At the same time, the closing movement of the halves of the cup C is so arranged as to cause the halves to close together and to be forced up against the bottom of the mold M by the action of the spring 196 which controls this closing movement. We deem the geometrical relations of the pivotal mounting for the measuring cup to be one of the features of our invention.

The secondary shears S', their mounting, movement, and operation

While we have provided a primary shear S for each of the blank molds M and arranged on the rotary carrier for movement with their respective molds, we preferably employ but one secondary shear mechanism S', these shears being arranged to cooperate with each of the blank molds in succession and moving with an oscillatory movement in a path calculated substantially to coincide with the path of the molds during the time the shears are engaged in their operation of shearing glass, as above generally set forth in describing the cycle of the "fill and empty" process.

Referring to Fig. 18 where the secondary shear S' is shown, it is seen that this shear comprises in its preferred form a pair of cooperating shear blades 210 which are arranged for opening and closing movement. The shear blades 210 are preferably supported upon a cross head 211 which is provided with a pair of guide rods 212 passing loosely through suitable openings in the head 213, of a cylinder 214. The cylinder 214 is mounted upon an oscillating carriage 215 which is arranged to travel back and forth in guides 216 supported by a base member 217.

The base member 217 may be adjusted angularly about the axis of the mold carrier by providing therein elongated curved slots 218 through which pass bolts 219, securing this base member to a lower base member 220 which is rigidly secured in respect to the base 1 of the machine in a manner not specifically illustrated. It will be understood that the guides 216 may be either straight in order that the path of the shears be substantially tangent to, but approximating the path of the centers of the blank molds M, or curved in such manner that the cylinder 214 will be required to move concentrically with the mold carrier.

Means are provided for moving the slide 215 and the cylinder 214 back and forth along the guides 216 to cause the shears to oscillate and thus to follow the several molds in succession. For this purpose, the slide 215 is connected by a flexible cable 221 with the end of a bell crank lever 222, the cable passing around a suitable sheave 223 intermediate its ends. The lever 222 is pivoted on a vertical pintle 224 secured to a base member portion 225 which is rigid with the base 1. On the arm of lever 222 opposite to that to which the cable 221 is secured is mounted a cam roller 226 arranged to engage the outer periphery of a cam 227 secured to the continuously rotating vertical shaft 180, the drive for which has previously been described. In order to retain the roller 226 against the cam 227 and to move the slide 215 to the left as seen in Fig. 18, there is provided a suitable counterweight (not shown) attached by a cable 228 to the opposite end of this slide, the cable passing around sheaves 229 and 230, and thus exerting a constant pull on the slide 215.

The details of the arrangement of the shear operating mechanism for shears S' are not fully illustrated, as this mechanism is not our invention, but known in the art, a similar type of shears and operating mechanism being illustrated in Hiller Patent No. 1,732,305, granted October 22, 1929. In general, however, the arrangement is such that upon admission of pressure to cylinder 214 through the pipe 231, the piston is moved downwardly as seen in Fig. 18, moving the shears first bodily into alignment with the glass to be severed up to the point when the heads 232 on the rods 212 come into engagement with the rear face of the flange of head member 213. Continued movement of the piston in the cylinder 214 in the same direction will then be effective to close the shears, due to a relative movement between the cross head 233 carried by the piston rod and the head 211 and compressing the springs 234 which have up to this time held the shears open. Reverse movement of the piston due to the reversal of pressure in cylinder 214 will be effective first to open the shear blades and thereafter to retract them to the position shown in Fig. 18. The application of pressure to the cylinder 214 may be controlled by a valve 235 of known design, which may be timed in any suitable manner by means (not shown) synchronized with the operation of the machine as a whole.

*The final blow mold, mounting and operating means*

We prefer to provide a final blow mold on the mold carrier for each of the blank molds, the molds being indicated at F as above set forth in discussing generally the cycle of the machine.

The molds F are constructed in the usual manner in mating portions or halves. The mold halves are supported in mold holders 236 and 237 (Figs. 10 and 18). The mold holders 236 and 237 are mounted on a common vertical pintle 238 which is rigidly mounted in a swing carriage 239. The carriage 239 is provided with upper and lower bearing portions 240 and 241 as best illustrated in Figs. 9 and 21 and is mounted upon a rock shaft 242 which is journaled in upper and lower bearings 243 and 244 respectively on the mold carrier.

Means are provided for vertically adjusting the blow mold as a whole in order to cooperate with blank molds of different heights, or for other purposes such as a set up adjustment. For this purpose, the lower bearing portion 241 is splined to the rock shaft 242 as indicated by the use of a spline 245. The upper bearing is threaded on a nipple 246 which is supported as illustrated in Fig. 21 against vertical movement by resting on an internal upwardly facing shoulder 246a on the rock shaft 242, so that the rotation of the nipple 246 will be effective to raise or lower the swing carriage 239.

The method of transfer which we prefer to employ with the machine as illustrated is first to open the blank mold M to leave the formed blank or parison suspended from the neck ring N, then to move the blow mold while open to a position to enclose the depending blank or parison, then to close the blow mold around the blank or parison below the neck finish thereof, then to open the neck ring to release the blank or parison to the blow mold, then to move the blow mold when closed back to the final blowing position which is that shown in Figs. 10 and 18. The means usable for these purposes in the machine of the accompanying drawings comprises means to swing the rock shaft 242 to move the swing carriage 239 and the blow mold bodily between the named positions. For this purpose, the rock shaft 242 is provided at its upper end with a bell crank arm 247 (Fig. 10). One arm of this bell crank is provided with a cam roller 248 which is arranged to cooperate with a suitable stationary cam 249 (Fig. 9) rigidly carried by the upper stationary hollow column extension 5. For urging the cam roller 248 against the cam and for moving the blow mold toward the blank mold position, a tension spring 250 is provided, connecting the other arm of the bell crank, as seen in Fig. 10, and a suitable anchorage 251 which is rigid with the mold carrier.

Means are provided for opening and closing the blow mold at the desired times. For this purpose, we have illustrated a pneumatic cylinder 252 (Figs. 10 and 18) which is preferably secured to the swing carriage 239. To the piston rod in cylinder 252 is secured a vertical pintle 253 which is connected by links 254 and 255 to the mold holders 237 and 236 respectively. In order to guide the movement of the piston and also to insure the closing of the blow mold halves at the desired position, the pintle 253 may be extended upwardly through the horizontal web of the swing carriage 239 and ride in a slot 256 provided therein. Thus the blow mold may be opened or closed irrespective of the swinging or position of the swing carriage 239.

For controlling the application of pressure to the cylinder 252, there is provided one of the valves in the valve chest 29 (Fig. 15) which is controlled by a suitable rocker member 257 with which are associated cam rollers 258 cooperating with a pair of substantially complementary cams adjustably secured around the cam drum 34 in a pair of slots 33. Thus it will be seen that pressure may be supplied to and exhausted from the opposite ends of the cylinder 252 at any desired time for carrying out the operation as will be hereinafter described.

*The bottom plate for the final blow mold, supporting and tilting means therefor*

Figure 6:
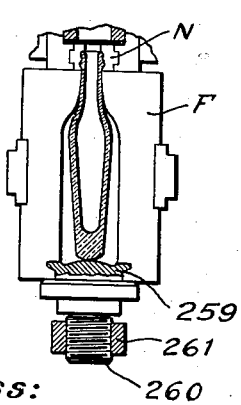
Figure 7:
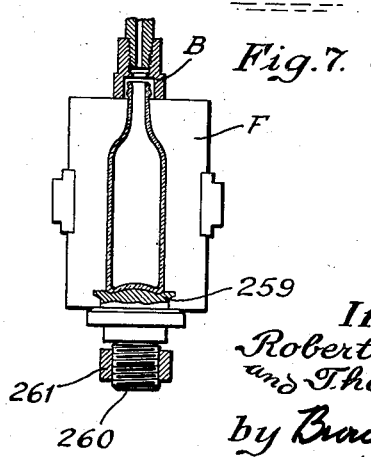

The final blow mold bottom plate 259 is best shown in Figs. 6 and 7 and is arranged to be locked in a predetermined relation with the final blow mold upon the closing of the latter as in the usual practice. The bottom plate is provided with a screw stud 260 threaded into a support 261 so that different bottom plates may be substituted as necessary for cooperation with molds of different types. The support 261 is provided with horizontal pintles received in suitable bearings in a bracket 262 (Fig. 8). One of these pintles is extended beyond the bracket and carries a crank 263 which is connected to a link 264 (Figs. 8 and 10). The link 264 passes loosely through a bearing 265 which is secured to the swing carriage 239. Outside this bearing and surrounding the link 264 is a compression spring 266 extending between the member forming the bearing and a suitable stop collar 267 on the link 264. This spring at all times tends to move the link 264 away from the blow mold bottom plate, which through the crank 263 tends to keep the bottom plate in its operative horizontal position against a suitable stop 264a on the link 264, which is arranged to abut against one side of the bearing 265 as shown.

After the blow mold has opened and a glass article has normally been removed therefrom by any suitable means (not shown), it is desired to tilt the bottom plate for the purpose of dumping therefrom any glass which remains thereon. For this purpose, the link 264 is provided on its end opposite from the bottom plate with the roller 268 which is adapted to engage a suitable abutment 269 on a part of the frame member 136 which is rigid with the mold carrier.

In order to tilt the bottom plate as above set forth and after the blow mold has opened, the swing carriage 239 is moved further away from the blank mold position than the final blowing position of the blow mold which is shown in full lines in Figs. 10 and 18. This causes the engagement of roller 268 with the abutment 269, thus moving the link 264 to rotate the crank 263 and thus tilt the bottom plate. Upon the blow mold being moved back by the swinging means therefor to its final blowing position, the spring 266 will be effective to right the bottom plate in readiness for the closing of the blow mold about the next succeeding blank to be blown therein.

*Final blow head, operating and adjusting means therefor*

Any usual type of final blow head B may be employed for applying final blowing pressure to the interior of the final blow mold, this head being shown in detail only in Fig. 7 and being conventional in design. The final blow head B is mounted on the lower end of the piston rod 270 associated with a pneumatic cylinder 271 (Fig. 8). The cylinder 271 is mounted on a bracket 272, which is in turn vertically slidable in suitable guides 273 on the frame member 136 for vertical adjustment of this cylinder and the blow head B for cooperation with blow molds F of different heights.

For the purpose of vertically adjusting the bracket 272 and hence the blow head B, there is provided a screw 274 which is swiveled in a suitable bearing 275 in a lug formed on the member 136 of the mold carrier and is threaded in a suitable part of the bracket 272. If desired, the guide members 273 may be made as clamping members so as to secure the parts in adjusted position.

Pressure may be conducted to the opposite ends of the cylinder 271 in a manner not specifically illustrated from one of the valves in the valve chest 29 (Fig. 15). As shown, this pressure is controlled by a rocker member 276 having spaced cam rollers 277 thereon for cooperation with a pair of complementary cams (not shown) which are received in two of the grooves 33 in the cam drum 34.

Pressure for blowing the articles to final form may be conducted to the blow head through a bore in the piston rod 270 from a lateral bore which is open to the interior of cylinder 271 once the blow head B has seated on the mold, as will be understood from the dotted line showing of the bores at 278 in Fig. 8.

Thus raising and lowering of the blow head B causes the initiation and cessation of the application of blowing pressure and both are preferably controlled by the single set of cams which control the rocking of the rocker member 276.

*The operation of the machine*

Having now described the various instrumentalities and arrangements of our machine, we will now describe the operation thereof with reference both to the diagrammatic and functional Figures 1 to 7 and the remaining structural figures of the drawings.

At the start of the process, the blank mold M and neck ring N both are closed due to pressure being applied to the radially outer ends of the blank mold closing cylinder 25 and the neck ring closing cylinder (not shown). The head H is also in cooperative relation with the blank and neck molds. The neck plunger P is in its lowermost position due to the lever 73 (Fig. 9) being in a substantially horizontal position so that some pressure is applied on to the neck plunger through the spring 70 (Fig. 11). The vacuum valve 105 is closed due to the lever 73 not being down to the position shown in Fig. 9. The charge receiving cup C is open, due to the thrust rod 195 associated therewith being in its lowermost position so that this cup is in the position shown at the front center in Fig. 8 and in dot and dash lines in Fig. 16.

The dipping frame is now lowered due to the cam roller 143 riding down the inclined portion 279 (Fig. 12) of cam 144. At the time this cam roller reaches the lowermost level 280 in that figure, the blank mold is in charge gathering relation in respect to the gathering surface 281 of the glass in the gathering pool. Suction is applied either just before, as or just after the blank mold reaches its gathering position by the counterclockwise rotation of the lever 73 (Fig. 9) about the axis of its pivot 74 to open the valve 105. At this time, suction is applied both through the grooves 109 to the crack between the halves of the blank mold M and also in the intervening space between the neck plunger P and the neck ring N, through the space 112 from the groove 110 through the grooves 111.

Figure 1:
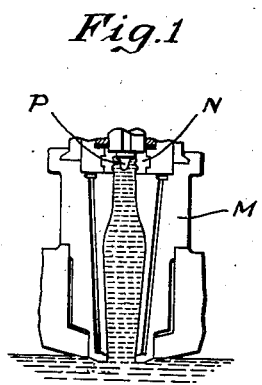

After the mold M has been filled with glass, as shown in Fig. 1, it is raised due to the raising of the dipping frame by rotation of the turret so that roller 143 (Fig. 12) rides from the level 280 of cam 144 to the level 282 in that figure. Shearing is then effected by the primary shears S due to their associated roller 169 riding into the notch 172 of cam 170, which is accomplished by the reverse movement of the roller 169 and the cam 170, as above set forth. The shear blades remain closed for the desired length of time and then are opened at the desired rate due to the configuration of the cam track 178 (Fig. 18). This operation is shown in Fig. 2.

The dipping frame is then raised to a higher level due to the roller 143 riding up to the level 283 of the cam 144 (Fig. 12), at which point the cup C is closed beneath the blank mold as shown in Figs. 3 and 16 and pressure is applied through the neck ring N for the "empty blow" It will be understood, of course, that prior to this time vacuum has been cut off due to the closing of the valve 105 (Fig. 9) by the upward (clockwise, Fig. 9) movement of the lever 73 and the continued upward movement of this lever in the same direction has resulted in the retraction of the plunger P. The pressure is now admitted through the neck ring under control of the valve 114 operated by the rock shaft 119 (Fig. 10). Once this empty blow has proceeded far enough so that the measuring cup C is filled with glass, pressure is cut off through the neck ring and any pressure remaining in the hollow body of glass is vented to the atmosphere through valve 117 due to the member 119 rocking in the opposite direction.

Figure 4:
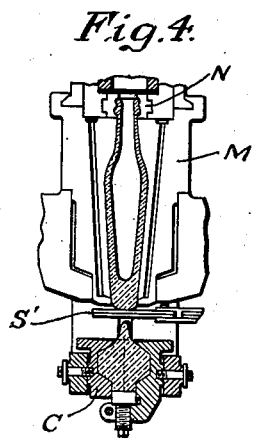

The blank mold M is then elevated to the next higher level, as indicated by the level 284, Fig. 12, for the cam 144, which is the position of the parts shown in that figure. The mold is now in the position of Fig. 4 and the secondary shearing may take place due to the fact that the relative movement of the blank mold M and cup C has attenuated the glass connecting the hollow body in the blank mold with that in the cup C. This secondary shearing is effected by the shears S', Figs. 4 and 18, which are at this time traveling in substantial synchronism with the mold in question and are operated as above set forth due to the pressure being applied through the valve 235 and pipe 231 to the cylinder 214, first to move the shears forward into a position to shear the glass and thereafter to close the shears to sever the glass as shown in Fig. 4. Once the shearing has been completed, the shears S' are again opened and retracted to the position shown in Fig. 18 and are oscillated back to cooperate with the next succeeding mold.

The dipping frame is now moved up to the highest level of its travel in which the roller 143 rides on to the part 285 of the cam 144, as shown in Fig. 12. The blank or parison has now been completed and is in readiness for the transfer.

The transfer is effected first by opening the blank mold due to the application of pressure to the radial inner end of cylinder 25 to leave the completed parison or blank depending from the neck ring N. At this time, the blow mold is opened and is moved to a position to enclose the depending blank under the control of the cam 249 (Fig. 9) operating on cam roller 248 to swing the carriage 239 carrying the blow mold and its opening and closing mechanism. When the blow mold has reached a position in alignment with the blank, it is closed due to the application of pressure to the radially inner end of cylinder 252 under control of the appropriate valve in the valve chest 29. The neck ring N is then opened by the application of pressure to the neck ring operating cylinder, under control of its associated valve, leaving the blank within the blow mold.

The blow mold with the blank therein is now moved back to the final blowing position shown in full lines in Figs. 10 and 18 and final blowing is carried on as shown in Fig. 7 by the lowering of the final blow head B and the application of pressure as above set forth. Once this operation has been completed, the blow head is raised and pressure therethrough cut off and the blow mold opened by its associated cylinder 252 for the removal of the completed article, which may take place either manually or by any suitable automatic mechanism, not shown. After the completed article has normally been removed, the swing carriage 239 is moved further away from the blank mold position to cause the tilting of the bottom plate for dumping off any glass remaining thereon, so as to prepare the parts for the receipt of the next succeeding article in the blow mold.

The above described sequence of operations may be varied in some instances, as for the production of ware of certain types, by partially expanding the glass in the blow mold F subsequent to the closing thereof around the blank while it remains suspended from the neck ring N, the air in this case being supplied through the valve 114, which is operated as above described by an additional protrusion on its associated cam to supply air through the neck ring partially to expand the glass in the final blow mold. Subsequent to the completion of this partial expansion, the neck ring N may be opened as aforesaid, the blow mold F moved to its normal final blowing position and final blowing pressure may be supplied through the blow head B, as above described.

It will be noted that the blank forming means and final blowing means are wholly separate and distinct each of the other and are arranged so that these two operations are carried on at two spaced positions on the machine. This arrangement gives rise to the function that by proper timing of the various operations which can be done by properly arranging the various adjustable cams, the blank forming and final blowing may take place in some overlapping time relationship, that is, a completed blank or parison may be enclosed within the final blow mold and final blowing pressure may or may not be supplied thereto during a part of the same time when the blank mold in which this same parison or blank was formed is gathering glass for the formation of the next succeeding article or in which glass thus gathered is being treated in some further stage of the operation as above set forth. This overlapping cycle type of mechanism results in a much more efficient machine than would be had if it were necessary, as in certain of the older type machines, to wait for the completion of the formation of one article before the formation of the next succeeding article in the same forming unit could be started.

*Conclusion*

While we have shown and described but one form of our mechanism embodying many individual novel ideas, we contemplate that many changes in detail may be made therein and equivalent mechanism may be substituted where desired, all within the scope of our invention. We further contemplate that certain of the features of our invention may be embodied in other types of machines operating according to other cycles or performing other processes than that specifically described.

Certain of the structural elements of the organized machine of the present invention, as herein disclosed, also are disclosed but not claimed in the co-pending application of Everett O. Hiller, Serial No. 639,777, filed Oct. 27, 1932 for "Method of and apparatus for forming glassware" now Patent No. 1,992,948, granted March 5, 1935, in conjunction with cooperative mold, measuring receptacle and severing mechanism and methods which may be performed by the use thereof, as pointed out in the specification and defined by the claims of said application of said Hiller. The Hiller application and the present application and the inventions of the disclosures thereof are both owned by the Hartford-Empire Company.

We do not wish to be limited therefore except by the scope of the appended claims, which are to be construed as broadly as the state of the prior art permits.

We claim:

1. Apparatus for making hollow glassware, comprising in combination a mold, means for filling said mold with molten glass, a measuring receptacle, means for holding said receptacle in such relation to said mold as to receive glass therefrom, means for applying force to the glass in said mold in such manner as to force the central core portion of such glass out of the mold and into said measuring receptacle to fill said receptacle, and means for adjustably varying the capacity of said receptacle for thereby predetermining the amount of glass which can be forced thereinto from said mold in the forming of a glass article.

2. Apparatus for making hollow glassware, comprising in combination a mold, means for filling the mold by suction from a pool of molten glass, means for shearing the glass in the mold from that in the pool, a measuring receptacle, means for bringing the measuring receptacle into an operative position below and in axial alignment with the mold so as to receive glass therefrom, means for supplying pneumatic pressure to the interior of the glass in the mold through the neck end thereof for forcing the hot interior glass downwardly out of the mold to fill the measuring receptacle, said receptacle including lateral side portions and a separate bottom portion, means for adjustably controlling the vertical position of said bottom portion of the measuring receptacle in respect to the side portions for predetermining the capacity of said receptacle, means for causing a relative movement between said receptacle and the mold subsequent to the filling of the former by the glass from the interior of the mold, means for shearing the glass in said receptacle from that in the mold to leave a hollow body of glass in the mold, a final blow mold, means for transferring the hollow body of glass formed as aforesaid from the first named mold to the final blow mold, and means for blowing the glass to final form in the final blow mold, whereby the adjustable variation in the capacity of said measuring receptacle affords a control of the weight and of the wall thickness of the completed article.

3. Apparatus for forming hollow glassware, comprising a mold constructed and arranged to gather a charge of molten glass from a gathering pool by suction, means for opening and closing said mold, means for moving said mold between a position in relation to the glass of the gathering pool such that glass may be gathered by and into said mold and a position at a higher elevation than the gathering position for the performance of some subsequent operation, and automatice means for preventing the lowering of said mold to its gathering position if the mold is not fully closed.

4. Apparatus for forming hollow glassware, comprising a suction gathering mold, means including a pneumatic cylinder and an associated linkage for opening and closing said mold, means mounting said mold and its opening and closing means for substantially vertical movement in a predetermined path between a lower gathering position for said mold and an upper position at which some other operation may take place, means for moving said mold and its operating means vertically between said positions as aforesaid, latch means for preventing the lowering of said mold and its associated operating mechanism, and means including a part of said linkage for tripping said latch to permit the lowering of said mold and its associated mechanism only when said linkage is in such a position that the mold is fully closed.

5. Apparatus for forming hollow glassware, comprising a rotatable carrier, a suction mold on said carrier, shears arranged for cooperation with said mold at least during the time shearing is to be carried on, means for moving said shears in coincidence with said mold as aforesaid, a cam arranged for oscillation, a cam follower and associated mechanism cooperating with said cam for operating said shears, and means for oscillating said cam in such a manner that during the time shearing is to be carried on the cam is moving in a direction opposite to the movement of the cam follower associated with said shears, whereby said shears are given a rapid shearing action with a relatively easy slope on said cam.

6. Apparatus for forming hollow glassware, comprising a rotary carrier, means for rotating said carrier continuously, a plurality of suction molds arranged around the periphery of said carrier, shears for cooperating with each of said molds respectively and mounted on and rotating with said carrier, a cam concentric with the axis of rotation of said carrier and arranged for oscillation about said axis, cam follower mechanism associated with each of said shears and cooperating with said cam, a second cam arranged to be rotated continuously in synchronism with the rotation of said carrier, and means operated by said second cam for imparting oscillatory movements to the first named cam and so constructed and arranged that said first named cam will be moved in a direction opposite to the rotation of said carrier at the time the portion of the first named cam which causes closing of the shears is in cooperative relation with said shear operating mechanisms, whereby the configuration of said two cams may be such as to cause a rapid closing movement of said shears, followed by a predetermined desired period during which the shears are respectively held closed, followed by an opening movement of said shears at a desired rate, while the slopes of all portions of both cams may be relatively gradual.

7. Apparatus for forming hollow glassware, comprising a blank mold, a blow mold associated therewith, means mounting said blow mold for pivotal movement toward and from a position coaxial with said blank mold to receive a blank therefrom, cam means for swinging said blow mold between the blank mold position and a final blowing position spaced therefrom, a bottom plate for said final blow mold mounted for tilting movement about a horizontal axis in respect to said blow mold, a crank rigid with said bottom plate, a link moving bodily with said blow mold and pivotally connected to said crank, resilient means operating on said link and tending to move said bottom plate to and maintain it at its operative position in respect to said blow mold, an abutment fixed in respect to the final blowing position of said blow mold and arranged in alignment with said link, and means for tilting said bottom plate subsequent to the opening of said blow mold including a portion of the cam which swings said blow mold so constructed and arranged that said blow mold is bodily moved about its pivotal axis away from the blank mold position subsequent to the opening thereof causing said link to engage said abutment and rotating said crank to tilt said bottom plate against the action of the resilient means which tends to maintain said bottom plate in its operative position.

8. Apparatus for forming hollow glassware, comprising a rotary carrier, a plurality of suction molds arranged around the periphery of said carrier, shearing means mounted on said carrier for each of said molds respectively for severing the glass drawn into said molds by suction from that in the gathering pool from which the glass is drawn, means for operating said shearing means, means cooperating with said molds subsequent to the shearing as aforesaid for blowing out a portion of the hot central core of glass through the suction opening of said molds to provide a hollow body of glass within said molds, a second shears arranged outside said carrier for cooperation with each of said molds successively to shear the glass blown out of the mold as aforesaid from that remaining in the mold, means for operating said second shears to shear the glass as aforesaid, and means for moving said second shears to cause them to travel successively with each of said molds.

9. Apparatus for forming hollow glassware, comprising a continuously rotating carrier, a plurality of suction blank molds mounted on said carrier about the periphery thereof, means for raising and lowering said blank molds to and from a gathering position adjacent to a gathering pool and an upper blank forming position, shears individual to each of said blank molds and mounted on said carrier for severing the glass drawn into said blank molds from the gathering pool, a cam arranged concentric with said carrier for operating said shears, a receptacle individual to each of said blank molds and mounted on said carrier so as to be brought into alignment with and adjacent to said blank molds for receiving glass therefrom subsequent to the severing of the glass as aforesaid, means for forcing a part of the hot glass from the interior portion of the glass in the blank molds into said receptacles to leave a hollow body of glass within said molds respectively, means for relatively moving said blank molds and said receptacles to cause attenuation of the glass therebetween, a second shears not partaking of the rotary movement of said carrier, but arranged to oscillate adjacent thereto so as to follow and cooperate with each of said blank molds in succession, means for moving said second shears to cause it to follow each of said molds as aforesaid and to return said second shears for engagement with the next succeeding mold, means for operating said second shears to sever the attenuated glass connecting the glass in said molds with that in the associated receptacles, a final blow mold associated with each of said blank molds, means for transferring blanks thus formed from said blank molds to said final blow molds, and means for blowing the blanks to final form in said final blow molds.

10. Apparatus for forming hollow glassware, comprising a mold, means for filling said mold with molten glass, a measuring receptacle arranged to be brought into glass receiving position in respect to said mold, means thereafter operative for supplying pneumatic pressure through the neck end portion of said mold to force the central core portion of the glass charge out of the mold and into said receptacle to fill the latter and thereby to leave a hollow body of glass in said mold, and means operative subsequent to the termination of the application of such pressure for venting the interior of the hollow body of glass in the mold to the atmosphere to prevent undue expansion or collapsing of the body of glass in the mold.

11. Apparatus for forming hollow glassware, comprising a suction gathering mold, means for filling said mold with molten glass from a gathering pool by suction, means for severing the glass in said mold from that in said pool to leave the mold substantially filled with molten glass, a measuring receptacle arranged to be brought into glass receiving position in respect to the charging opening of said mold, means for supplying pneumatic pressure through the neck end of said mold to force the hot central core of the glass into said measuring receptacle and thereby to leave a hollow body of glass in said mold, a valve for controlling the application of pressure through the neck end of said mold as aforesaid, a second valve communicating between the interior of the neck end of said mold and the atmosphere for venting the interior of the hollow body of glass to the atmosphere, a common valve operating means for both said valves so constructed and arranged as first to open said pressure valve to supply pneumatic pressure to the interior of said mold and thereafter first to close said pressure valve and then by continued movement in the same direction to open the venting valve to vent the interior of said hollow body and thus to prevent undue expansion or collapsing thereof during subsequent operations, means for causing a relative movement of said measuring receptacle and said mold to attenuate the glass therebetween, and means for severing the glass in said measuring receptacle from that in said mold.

12. Apparatus for forming hollow glassware, comprising a rotary support, means for rotating said support continuously, a dipping frame mounted for vertical sliding movement in respect to said support, a suction gathering blank mold on said dipping frame, a neck ring associated with said blank mold and mounted on said dipping frame, a suction head also mounted on said dipping frame, means for moving said dipping frame vertically with respect to said support to lower said blank mold into glass gathering relation to a pool of molten glass and for raising said blank mold, means mounting said head on said support including cooperating guide members on one side of said head and a shaft rigid with said head and spaced from said guide members passing through a split collar in said frame, means for vertically adjusting said head with respect to said frame to compensate for blank molds of different heights, a final blow mold arranged for cooperation with said blank mold, means for adjusting said final blow mold vertically with respect to said support to compensate for the use of blank molds of different types and heights, means for transferring blanks formed in said blank mold to final blow mold, and means for blowing blanks to final form in said final blow mold.

13. Apparatus for forming hollow glassware, comprising a support, a suction blank mold mounted on said support for substantially vertical movement in respect thereto, a measuring receptacle arranged to be brought into glass receiving relation with the charging opening of said blank mold after the blank mold has been raised with respect to its charge gathering position, said measuring receptacle being formed in mating portions, means for supporting and moving the mating portions of said measuring receptacle so constructed and arranged that when the portions of said measuring receptacle are opened to their fullest extent, the blank mold may be lowered therebetween to its charge gathering position, means for supplying vacuum to gather a charge of glass in said blank mold, means operative subsequent to the raising of said blank mold and the positioning of said receptacle in glass receiving relation thereto for forcing the central core portion of the glass from said blank mold into said receptacle to fill the latter, and means for severing the glass between said blank mold and said measuring receptacle subsequent to the filling of the latter.

14. Apparatus for forming hollow glassware, comprising a support, a suction blank mold mounted on said support and arranged for vertical movement in respect thereto between a lower charge gathering position and an upper position at which certain further operations may take place on the glass, a measuring receptacle formed in mating halves and arranged to be brought subsequent to the raising of said blank mold into glass receiving relation with the bottom thereof, means for forcing the central core portion of the glass from said blank mold into said measuring receptacle to fill the latter during the time they are in cooperative relation with one another, and supporting means for the halves of said measuring receptacle comprising a pair of horizontal pintles positioned at a level materially above that of the operative position of said measuring receptacle in respect to said blank mold and spaced apart a distance materially greater than the outside diameter of said blank mold, and arms supporting the halves of said gathering receptacle from said spaced horizontal pintles, whereby when said pintles are rotated to open the halves of said gathering receptacle, the blank mold may be lowered between the open halves of such receptacle to bring it to a glass gathering position in respect to a pool of molten glass.

ROBERT W. CANFIELD.
THOMAS WAUGH.